United States Patent
Wada

(10) Patent No.: US 8,571,095 B2
(45) Date of Patent: Oct. 29, 2013

(54) EQUALIZATION FILTER AND DISTORTION COMPENSATING METHOD

(75) Inventor: Shigeki Wada, Tokyo (JP)

(73) Assignee: NEC Corporation, Tokyo (JP)

( * ) Notice: Subject to any disclaimer, the term of this patent is extended or adjusted under 35 U.S.C. 154(b) by 1167 days.

(21) Appl. No.: 12/520,468

(22) PCT Filed: Nov. 30, 2007

(86) PCT No.: PCT/JP2007/073199
§ 371 (c)(1),
(2), (4) Date: Jun. 19, 2009

(87) PCT Pub. No.: WO2008/075548
PCT Pub. Date: Jun. 26, 2008

(65) Prior Publication Data
US 2010/0027609 A1 Feb. 4, 2010

(30) Foreign Application Priority Data

Dec. 19, 2006 (JP) .................................. 2006-341274

(51) Int. Cl.
*H03H 7/30* (2006.01)
(52) U.S. Cl.
USPC ........... 375/232; 375/233; 375/229; 398/158; 398/147; 398/149; 398/162; 398/136; 398/137; 708/300; 708/301; 708/314; 708/319; 708/322; 708/323; 708/819; 708/307; 708/320
(58) Field of Classification Search
USPC ......... 708/300, 301, 314, 319, 322, 323, 819; 708/320, 307; 398/158–162, 147–149, 136; 398/137; 375/232, 233, 229
See application file for complete search history.

(56) References Cited

U.S. PATENT DOCUMENTS

| 4,283,788 | A | * | 8/1981 | Tamburelli | ................. | 375/232 |
| 4,394,768 | A | * | 7/1983 | Sari | ................. | 375/232 |
| 4,872,184 | A | * | 10/1989 | Yamaguchi et al. | ......... | 375/232 |
| 7,391,822 | B2 | * | 6/2008 | Song et al. | ................. | 375/297 |

(Continued)

FOREIGN PATENT DOCUMENTS

| JP | 04-328994 | 11/1992 |
| JP | 08-097658 | 4/1996 |

(Continued)

OTHER PUBLICATIONS

Ito, T. et al., "Development of Ultra-wideband Electrical Equalizer Module for 40Gb/s signal and demonstration of its operation in the long-haul transmission experiment", IEICE Technical Report, Jun. 16, 2006, pp. 13-18, vol. 106, No. 105.

(Continued)

*Primary Examiner* — Daniel Washburn
*Assistant Examiner* — Rahel Guarino
(74) *Attorney, Agent, or Firm* — Scully, Scott, Murphy & Presser PC

(57) ABSTRACT

An equalization filter is provided for solving the problem in which there is a limited range in which compensated for distortion of a transmission signal can be made. Measuring instrument 104 measures a distortion quantity which characterizes distortion of the transmission signal. Comparator 105a generates a differential signal which indicates the difference between the transmission signal and a compensation signal. Delay device 105b delays the differential signal based on the distortion quantity measured by measurement instrument 104 and generates the compensation signal.

30 Claims, 14 Drawing Sheets

(56) References Cited

U.S. PATENT DOCUMENTS

| | | | |
|---|---|---|---|
| 7,587,145 B2* | 9/2009 | Shang et al. | 398/208 |
| 2003/0138256 A1* | 7/2003 | Rasztovits-Wiech | 398/147 |
| 2005/0265439 A1* | 12/2005 | Matsumura et al. | 375/232 |

FOREIGN PATENT DOCUMENTS

| | | |
|---|---|---|
| JP | Hei 09-036833 | 2/1997 |
| JP | 10-214102 | 8/1998 |
| JP | 2002-261692 | 9/2002 |
| JP | 2002-533004 | 10/2002 |
| JP | 2003-022056 | 1/2003 |
| JP | 2003-087198 | 3/2003 |
| JP | 2004-128974 | 4/2004 |
| JP | 2005-006151 | 1/2005 |
| JP | 2006-345284 | 12/2006 |
| WO | WO 00/36744 | 6/2000 |
| WO | WO 2006/049903 A2 | 5/2006 |
| WO | WO 2008/116747 A1 | 10/2008 |

OTHER PUBLICATIONS

Haunstein H.F. et al., "Principles for Electronic Equalizatin of Polarization-Mode Dispersion", *Journal of Lightwave Technology* 22(4):1169-1182 (Apr. 2001).

Momtaz A. et al., "A Fully Integrated 10-Gb/s Receiver with Adaptive Optical Dispersion Equalizer in 0.13-μm CMOS", *IEEE Journal of Solid-State Circuits* 42(4):872-880 (Apr. 2007).

Japanese Patent Application Publication No. Hei 09-036833, published Feb. 7, 1997, together with an English-language abstract.

Möller L. et al., "ISI Mitigation Using Decsion Feedback Loop Demonstrated With PMD Distorted 10Gbit/s Signals", *Electronics Letters* 35(24):2092-2093 (Nov. 25, 1999).

Japanese Patent Application Publication No. 2002-261692, published Sep. 13, 2002, together with an English-language abstract.

PCT International Publication No. WO 2006/049903 A2, published May 11, 2006.

Japanese Patent Applicaton Publication No. 2006-345284, published Dec. 21, 2006, together with an English-language abstract.

PCT International Publication No. WO 2008/116747 A1, published Oct. 2, 208; and.

Office Action dated Mar. 27, 2012 received from the Japanese Patent Office from related Japanese Application No. 2008-550083, together with an English-language translation.

Haunstein H.F. et al., "Principles for Electronic Equalization of Polarization-Mode Dispersion", *Journal of Lightwave Technology* 22(4):1169-1182 (Apr. 2004).

Möller L. et al., "ISI Mitigation Using Decision Feedback Loop Demonstrated With PMD Distorted 10Gbit/s Signals", *Electronics Letters* 35(24):2092-2093 (Nov. 25, 1999).

A. Borjak, et al., "High-Speed Generalized Distributed-Amplifier-Based Transversal-Filter Topology for Optical Communication Systems," IEEE Trans. Microwave Theory Tech., 1997, pp. 1453-1457, vol. 45, No. 8.

Wu, H. et al., "Differential 4-tap and 7-tap Transverse Filters in SiGe for 10Gb/s Multimode Fiber Optic Equalization" in Preprint Paper 10.4 of International Solid-State Circ[UI]t Conference (ISSCC) 2003.

Sewter, J. et al., "A comparison of Equalizers for Compensating Polarization-Mode Dispersion in 40-Bb/s Optical Systems", May 23, 2005, pp. 1521-1524, vol. 2, IEEE ISCAS.

Bülow, H. et al., "PMD mitigation at 10Gibit/s using linear and nonlinear integrated electronic equalizer", Jan. 20, 2000, pp. 163-164, vol. 36, No. 2, IEE Electronics Letters.

Buchali, F. et al., "Adaptive PMD Compensation by Electrical and Optical Techniques", Apr. 2004, pp. 1116-1126, vol. 22, Journal of Lightwave Technology.

Koc, U. et al., "Adaptive Opto-Electronic Compensator for Excessive Filtering, Chromatic and Polarization Mode Dispersion", Mar. 6, 2005, pp. 20-22, vol. 4, Optical Fiber Communication Conference 2005, Technical Digest.

\* cited by examiner

RELATED ART

RELATED ART

US 8,571,095 B2

EQUALIZATION FILTER AND DISTORTION COMPENSATING METHOD

TECHNICAL FIELD

The present invention relates to an equalization filter and a distortion compensating method, and more particularly, to an equalization filter and a distortion compensating method for compensating a transmission signal for distortion.

BACKGROUND ART

In a variety of transmission systems, a transmission signal becomes distorted due to dispersion, loss and the like caused by the transmission medium. An equalization filter is known as a technology for electrically compensating this transmission signal for distortion. Whereas there are a plurality of types of equalization filters, a weighted delay equalization filter is often used.

The weighted delay equalization filter is a feed forward type equalization filter, and is also referred to as a transversal filter, an FIR (Finite Impulse Response) digital filter, or a feed forward equalizer. Also, a weighted delay equalization filter is described, for example, in Non-Patent Document 1 (A. Borjak, et al., "High-Speed Generalized Distributed-Amplifier-Based Transversal-Filter Topology for Optical Communication Systems," IEEE Trans. Microwave Theory Tech., vol. 45, No. 8, pp. 1453-1457). In the following, the weighted delay equalization filter is called the "transversal filter."

FIG. 1 is a schematic diagram showing the configuration of a conventional transversal filter. In FIG. 1, the transversal filter comprises a plurality of delay elements, a plurality of weighting circuits, and an adder.

Respective delay elements are connected in cascade, and sequentially delay a signal applied to the transversal filter (hereinafter referred to as the "input signal"). Each of the weighting circuits multiplies one of the input signal or an output signal of each delay element by a weighting value (filter coefficient). The adder adds respective output signals of the respective weighting circuits.

In this regard, when a transmission signal is an electric signal, the transmission signal is applied to a weighted delay equalization filter. On the other hand, when a transmission signal is an optical signal, the optical signal is converted to an electric signal by a photo-diode or the like, and the converted electric signal is applied to an equalization filter.

An input signal can be compensated for distortion by using such a transversal filter.

The configuration of a transversal filter is described, for example, in Non-Patent Document 2 (Differential 4-tap and 7-tap Transverse Filters in SiGe for 10 Gb/s Multimode Fiber Optic Equalization in Preprint paper 10.4 of International Solid-State Circ[UI]t Conference (ISSCC) 2003). FIG. 2 is a circuit diagram showing the configuration of a transversal filter described in Non-Patent Document 2.

In FIG. 2, the transversal filter has the configuration of a distributed amplifier circuit, and comprises filter input terminal 801, filter output terminal 802, delay devices 803 and 804, weighting circuit 805, 50Ω load resistances 806, 807, input load resistance 808, and output load resistance 809.

Delay device 803 comprises a plurality of delay elements each formed of a 50Ω matched transmission path connected to filter input terminal 801 in cascade. Delay device 804 comprises a plurality of delay elements each formed of a 50Ω matched transmission path connected to filter output terminal 802 in cascade.

Weighting circuit 805 is formed of an amplifier with a plurality of gain adjustment terminals, and comprises a plurality of weighting circuits which are disposed at locations corresponding to respective amplification stages of a distributed amplifier circuit. A filter coefficient varies in response to adjustments to respective amplification amounts of the plurality of amplifiers. When signal distortion during transmission varies over time, the transversal filter compensates the transmission signal for distortion by varying the filter coefficient over time.

50Ω load resistance 807 is connected to delay device 804 in cascade to form an adder.

Non-Patent Document 1: A. Borjak, et al., "High-Speed Generalized Distributed-Amplifier-Based Transversal-Filter Topology for Optical Communication Systems," IEEE Trans. Microwave Theory Tech., vol. 45, No. 8, pp. 1453-1457

Non-Patent Document 2: Differential 4-tap and 7-tap Transverse Filters in SiGe for 10 Gb/s Multimode Fiber Optic Equalization in Preprint paper 10.4 of International Solid-State Circ[UI]t Conference (ISSCC) 2003

DISCLOSURE OF THE INVENTION

Problem to be Solved by the Invention

In optical communications, polarization mode dispersion (PMD) can occur. The polarization mode dispersion involves, for example, distortion experienced by a transmission signal having a particular polarization incident angle, resulting from the transmission of the transmission signal through a core portion of an optical fiber which has been deformed due to stress or the like.

A differential group delay (DGD) and a branch ratio ($\gamma$) of optical power are often employed as a distortion quantity which characterizes distortion of a transmission signal due to polarization mode dispersion. The differential group delay is the difference in time between the wave of an optical signal in a fast-axis direction of an optical fiber (hereinafter referred to as the "fast-axis wave") and the wave of the optical signal in a slow-axis direction of the optical fiber (hereinafter referred to as the "slow-axis wave"). Also, here, the branch ratio $\gamma$ of optical power indicates the proportion of optical power of the optical signal in the fast-axis direction to the entire optical power of the optical signal. Then, $1-\gamma$ indicates the proportion of optical power of the optical signal in the slow-axis direction to the entire optical power of the optical signal.

FIG. 3 is a schematic diagram showing distortion of a transmission signal due to polarization mode dispersion. In FIG. 3, the distortion of the transmission signal is represented in EYE waveform. EYE waveform 901 represents an EYE waveform of a transmission signal before transmission. EYE waveform 902 represents an EYE waveform of a distorted transmission signal due to polarization mode dispersion which occurs while the transmission signal is transmitted through the optical fiber.

Generally, when a transmission signal becomes distorted, inter-code interference occurs to cause errors in data. Thus, distortion of a transmission signal is detected as data error. An equalization filter such as a transversal filter compensates for distortion of a transmission signal by correcting the data error.

For correcting data error, it is necessary to determine the level of a transmission signal. Generally, the level of a transmission signal is such that a High level is determined when the amplitude of the transmission signal is larger than a median value of the amplitude of a High-level signal and the amplitude of a Low-level signal, and a Low-level is determined when the amplitude of the transmission signal is smaller than the median value.

In the case of distortion of a transmission signal due to the polarization mode dispersion, a slow-axis wave representative of a certain code of the transmission signal overlaps with a fast-axis wave representative of a code subsequent to that code, thus giving rise to inter-code interference. In this event, when the differential group delay is near N unit intervals (UI) and the branch ratio is approximately 0.5, a delay-axis wave representative of a certain code of a transmission signal overlaps with a fast-axis wave representative of a code subsequent to that code, making it difficult to determine the level of the transmission signal. This is because when the overlapping fast-axis wave and slow-axis wave of the transmission signal differ in level from each other, the transmission signal that has been converted to an electric signal presents a level which is near a median value.

For reference, the unit interval (hereinafter referred to as "UI") is a unit which represents a clock cycle. For example, 1 [UI] represents one clock cycle.

Therefore, a conventional transversal filter encounters difficulties in correcting data errors due to inter-code interference when the differential group delay is near N [UI] and when the branch ratio is approximately 0.5. This results in a problem in which there is a limited range in which the compensation for the distortion of a transmission signal can be made.

FIG. 4 shows how the waveform of an NRZ (Non-return to Zero) signal that is distorted due to polarization mode dispersion, making it difficult to determine codes of a transmission signal.

Such a phenomenon, i.e., polarization mode dispersion makes it difficult to determine the codes of a transmission signal, has not been known.

It is an object of the present invention to provide an equalization filter and a distortion correcting method which solve the problem, or the challenge described above, in which there is a limited range in which compensation for the distortion of a transmission signal can be made.

Means for Solving the Problem

To achieve the above object, an equalization filter of the present invention includes an input unit for receiving a transmission signal, a generation unit for generating a compensation signal for compensating the transmission signal for distortion, and a compensation unit for compensating the transmission signal for distortion based on the compensation signal. The equalization filter is characterized in that a measuring unit is included for measuring a distortion quantity which characterizes the distortion of the transmission signal, the compensation unit generates a differential signal which indicates the difference between the transmission signal and the compensation signal, and the generation unit delays the differential signal based on the distortion quantity measured by the measuring unit to generate the compensation signal.

Also, a distortion compensating method of the present invention is performed by an equalization filter comprising an input unit for receiving a transmission signal, a generation unit for generating a compensation signal for compensating the transmission signal for distortion, and a compensation unit for compensating the transmission signal for distortion based on the compensation signal, wherein the method includes a measuring step of measuring a distortion quantity which characterizes the distortion of the transmission signal, a differential step of generating a differential signal which indicates the difference between the transmission signal and the compensation signal, and a delaying step of delaying the differential signal based on the measured distortion quantity to generate the compensation signal.

Effects of the Invention

According to the present invention, it is possible to extend a range in which compensation for the distortion of a transmission signal can be made.

BEST MODE FOR CARRYING OUT THE INVENTION

In the following, exemplary embodiments of the present invention will be described with reference to the drawings.

Figure 5A:
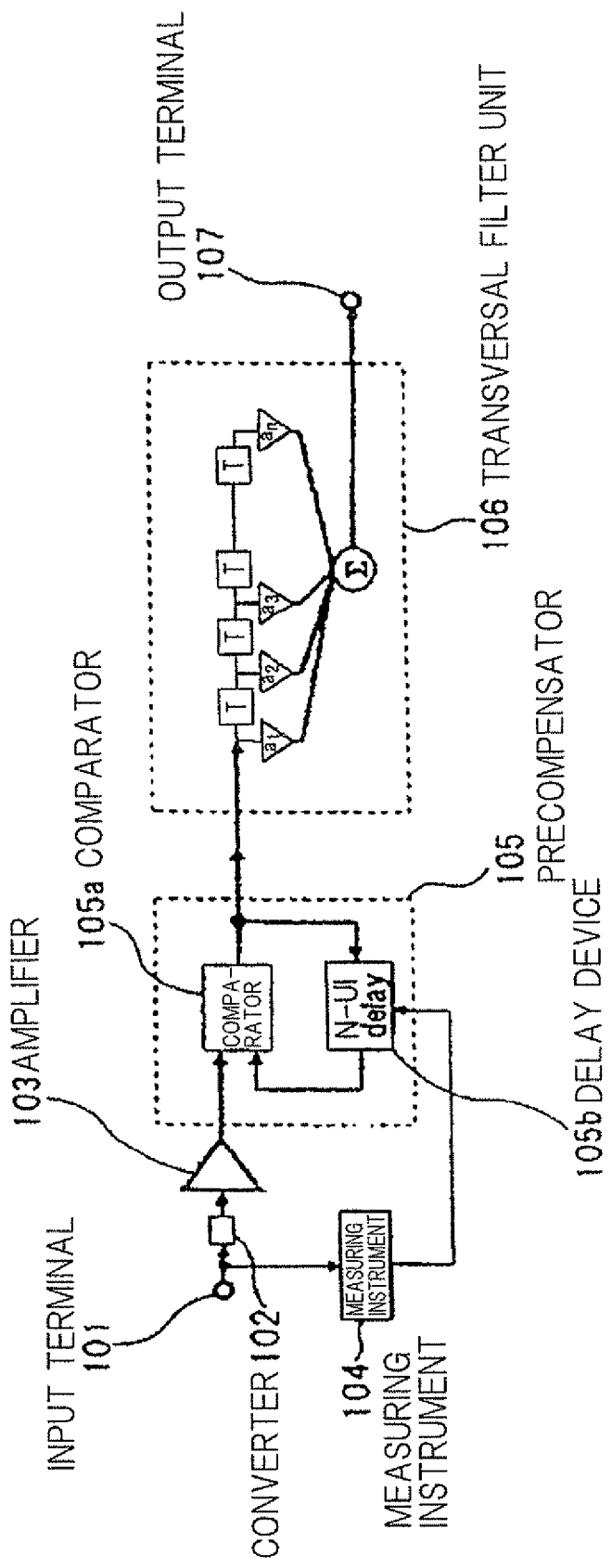
FIG. 5A A block diagram showing the configuration of an equalization filter according to a first embodiment of the present invention.

FIG. 5A is a block diagram showing the configuration of an equalization filter according to one exemplary embodiment of the present invention.

In FIG. 5A, the equalization filter comprises input terminal 101, converter 102, amplifier 103, measuring instrument 104, precompensator 105, transversal filter unit 106, and output terminal 107. Precompensator 105 comprises comparator 105a and delay device 105b.

Input terminal a101 receives a transmission signal from a transmitter (not shown) through an optical fiber (not shown). The transmission signal is an optical signal. Alternatively, the transmission signal may be a digital signal or an analog signal. Specifically, the transmission signal is assumed to be an NRZ signal.

Converter 102 is, for example, a photo-diode. Converter 102 converts the transmission signal, which is an optical signal, received by input terminal 101 to an electric signal.

Amplifier 103 amplifies the transmission signal converted to an electric signal by converter 102.

Measuring instrument 104 measures a distortion quantity which characterizes distortion of the transmission signal received by input terminal 101, and determines whether or not the distortion quantity falls within a particular range. The distortion quantity may be, for example, a differential group delay and an optical power branch ratio.

Precompensator 105 compensates for distortion of the transmission signal amplified by amplifier 103.

Comparator 105a compensates for distortion the transmission signal amplified by amplifier 103 based on a compensation signal generated by delay device 105b to compensate the transmission signal distortion. Specifically, comparator 105a generates a differential signal which represents the difference between the transmission signal and the compensation signal.

For example, comparator 105a assumes the transmission signal and compensation signal as ternary signals. Also, comparator 105a may take a ternary exclusive logical OR of the transmission signal and compensation signal to generate the result of the operation as the differential signal. In this event, "2" is given to the code of a signal which has an amplitude equal to or larger than a first threshold which is larger than the median value of a High level and a Low level; "0" is given to the code of a signal which has an amplitude equal to or smaller than a second threshold which is smaller than the median value; and "1" is given to a code of a signal which has an amplitude smaller than the first threshold and larger than the second threshold.

Delay device 105b is, for example, a flip-flop. Alternatively, delay device 105b may be, for example, a sample-and-hold type delay device, such as a D-type flip-flop, which fetches a differential signal in synchronization with a clock signal, and outputs the fetched differential signal.

Delay device 105b delays the differential signal generated by comparator 105a based on the distortion quantity measured by measuring instrument 104 to generate the compensation signal.

Specifically, when measuring instrument 104 determines that the distortion quantity falls within the particular range, delay device 105b delays the differential signal generated by comparator 105a by a predetermined delay amount to generate a compensation signal.

Assume that the delay amount of delay device 105b and the particular range for distortion quantity have been previously set by the designer of the equalization filter such that determination of the level of the transmission signal is valid.

For example, the particular range is at least a range in which the differential group delay is included between N−0.15M [UI] and N+0.15M [UI], and in which the branch ratio is included between 0.4 and 0.6. In this event, the determination of the level of the transmission signal is valid if the delay amount of delay device 105b has a value included at least between N−0.25 [UI] and N+0.25 [UI]. Here, N is an integer equal to or larger than one. Also, M is one when N is one and is two when N is two or more.

For example, when the differential group delay is between 0.85 [UI] and 1.15 [UI] and the branch ratio is between 0.4 and 0.6, the level of the transmission signal can be determined provided that the delay amount is set between 0.75 [UI] and 1.25 [UI] (equivalent to N=1). On the other hand, when the differential group delay is between 1.7 [UI] and 2.3 [UI] and the branch ratio is between 0.4 and 0.6, the determination of the level of the transmission signal is valid provided that the delay amount is set between 1.75 [UI] and 2.25 [UI] (equivalent to N=2).

In the following, N is referred to as a "reference number."

On the other hand, when measuring instrument 104 determines that the distortion quantity does not fall within the particular range, delay device 105b generates a Low-level signal or a High-level signal as the compensation signal in accordance with the distortion quantity such that the differential signal has the same sign as that of the transmission signal before dispersion.

For example, as the branch ratio approaches one, the amplitude of a fast-axis wave becomes larger than the amplitude of a slow-axis wave. As a result, the sign of the transmission signal after the transmission changes to the sign of the transmission signal before the transmission. In this event, when delay device 105b generates the High-level signal, the sign of the differential signal generated by comparator 105a becomes the same as that of the transmission signal before the transmission.

On the other hand, as the branch ratio approaches zero, the amplitude of the slow-axis wave becomes smaller than the amplitude of the fast-axis wave. As a result, the sign of the transmission signal after the transmission becomes the same as that of the transmission signal before the transmission In this event, when delay device 105b generates the Low-level signal, the sign of the differential signal generated by comparator 105a becomes the same as the sign of the transmission signal before the transmission.

Alternatively, when measuring instrument 104 determines that the distortion quantity does not fall within the particular range, delay device 105b may output the Low-level signal such that the sign of the differential signal applied to comparator 105a becomes the same as the sign of the differential signal output from comparator 105a. Assume in this event that the differential signal generated by comparator 105a is compensated by transversal filter unit 106 such that its sign becomes the same as the sign of the transmission signal before the transmission.

Transversal filter unit 106 is disposed subsequent to precompensator 105 to compensate for distortion of differential signal generated by comparator 105a.

Figure 5B:
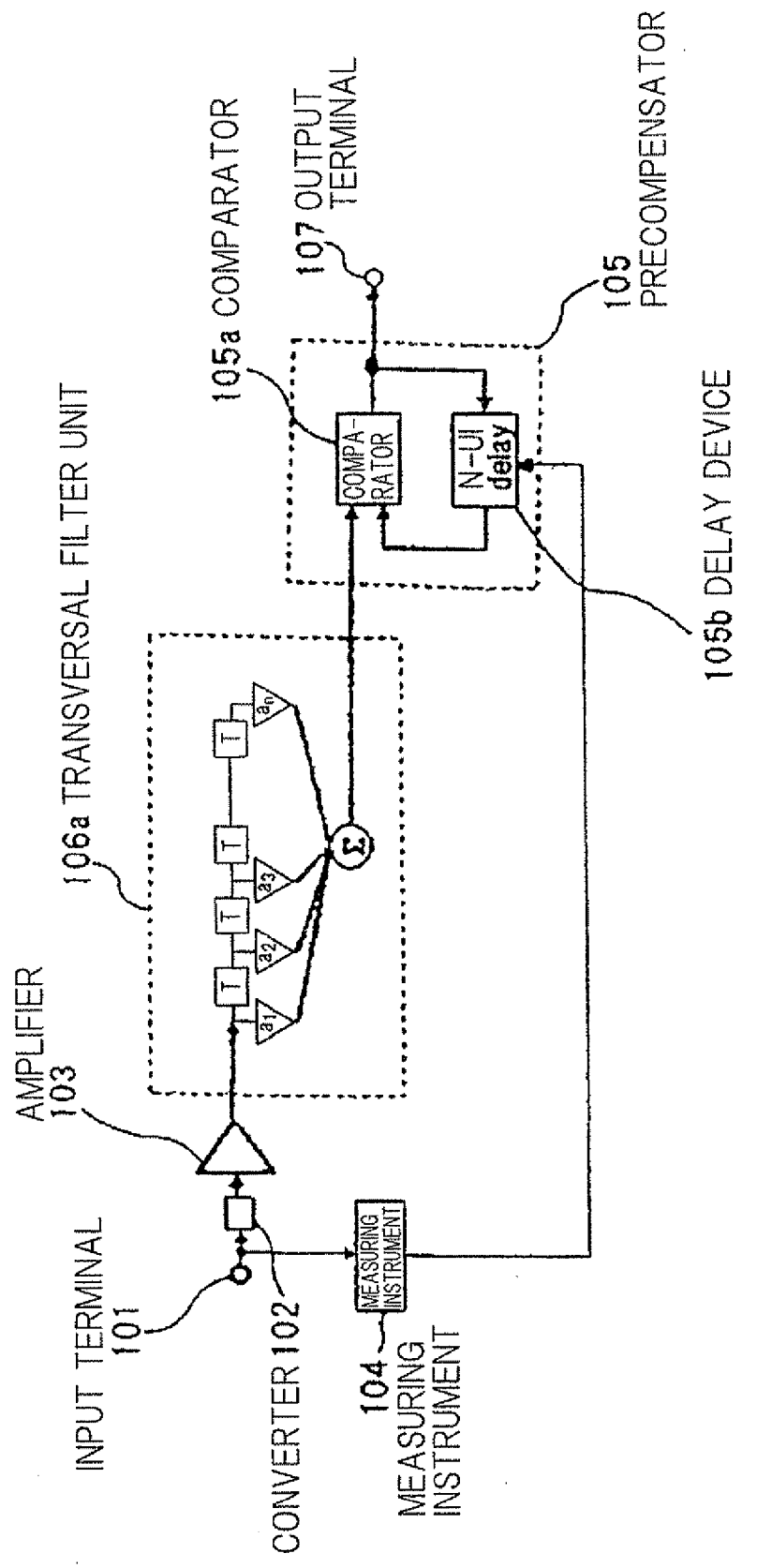
FIG. 5B A block diagram showing the configuration of an equalization filter according to another exemplary embodiment of the present invention.

While the transversal filter unit is disposed subsequent to precompensator 105, it may be disposed in front of precompensator 105. FIG. 5B is a block diagram showing an exemplary equalization filter which comprises the transversal filter unit disposed in front of precompensator 105.

In FIG. 5B, the equalization filter comprises transversal filter unit 106a instead of transversal filter unit 106. Transversal filter unit 106a compensates for distortion of a transmission signal amplified by amplifier 103. Comparator 105a generates a differential signal representative of the different between the transmission signal, whose distortion has been compensated for by transversal filter 106a and a compensation signal.

The distortion compensated for by transversal filter units 106 and 106a is distortion that can be compensated for by an associated equalization filter. For example, this distortion may be distortion of a transmission signal due to wavelength dispersion which occurs during optical transmission, distortion of a transmission signal due to electric reflection, loss and the like which occur during electric transmission, distortion due to polarization mode dispersion of a differential signal when a distortion quantity of the transmission signal does not fall within a particular range, and the like.

In this way, by providing at least one of transversal filter units 106 and 106a, compensation for distortion a transmission signal can be made even if input terminal 101 has distortion different from the distortion of the transmission signal compensated for by precompensator 105. Thus, more exact compensation for distortion of the transmission signal can be made.

For reference, transversal filter unit 106 is an example of a rear-stage filter unit, while transversal filter unit 106a is an example of a front-stage filter unit.

In this exemplary embodiment, assume that each of the front-stage filter unit and rear-stage filter unit includes a transversal filter. However, each of the front-stage filter and rear-stage filter unit may include at least one of a feed forward type equalization filter and a feedback type equalization filter.

Alternatively, the equalization filter may include transversal filter unit 106 subsequent to precompensator 105, and include transversal filter unit 106a in front of precompensator 105.

Turning back to FIG. 5A, output terminal 107 outputs the differential signal whose distortion has been compensated for by transversal filter unit 106.

Next, the operation will be described.

In this regard, assume that the distortion quantity is represented by a differential group delay and a branch ratio. Assume also that as the particular range, the differential group delay has been set between 0.85 [UI] and 1.15 [UI], and the branch ratio has been set between 0.4 and 0.6. Assume further that the delay amount of delay device 105b has been set to 1 [UI].

Upon receipt of a transmission signal from a transmitter through an optical fiber, input terminal 101 outputs the transmission signal to converter 102 and measuring instrument 104.

Upon receipt of the transmission signal, which is an optical signal, from input terminal 101, converter 102 converts the transmission signal to an electric signal, and outputs the transmission signal converted to the electric signal to amplifier 103.

Upon receipt of the transmission signal from converter 102, amplifier 103 amplifies the transmission signal. Amplifier 103 outputs the amplified transmission signal to comparator 105a.

Upon receipt of the transmission signal from input terminal 101, measuring instrument 104 measures the distortion quantity of the transmission signal. After measuring the distortion quantity, measuring instrument 104 determines whether or not the distortion quantity falls within the particular range.

Figure 6:
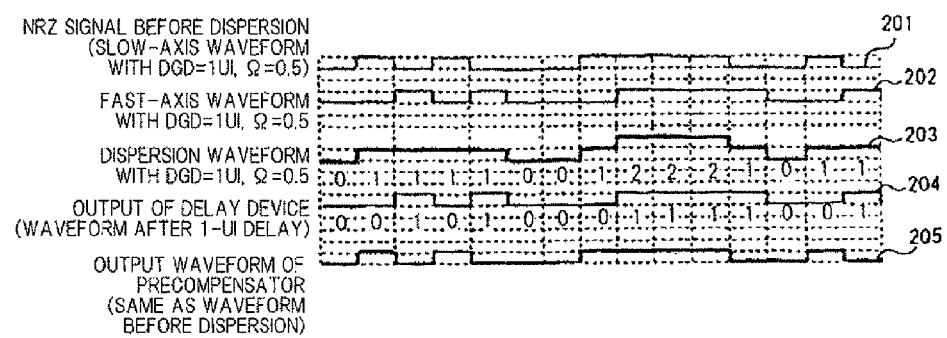
FIG. 6 A signal diagram for describing exemplary operations of the equalization filter.

FIG. 6 is a signal diagram showing an exemplary transmission signal which contains a distortion quantity which falls within the particular range. This transmission signal presents the differential group delay equal to 1 [UI] and the branch ratio equal to 0.5.

Waveform 201 represents the waveform of a slow-axis wave of this transmission signal. Waveform 202 represents the waveform of a fast-axis wave of this transmission signal. In this regard, waveform 201 is the same as the waveform of the transmission signal before the waveform is distorted due to polarization mode dispersion. Waveform 203 represents a waveform of the transmission signal converted to an electric signal by converter 102.

When determining that the distortion quantity falls within the particular range, measuring instrument 104 outputs a control signal indicative of a delay to delay device 105b.

Upon receipt of the control signal indicative of the delay from measuring instrument 104, delay device 105b delays the differential signal received from comparator 105a by 1 [UI] to generate a compensation signal. Delay device 105a outputs the compensation signal to comparator 105a. Waveform 204 represents the waveform of the compensation signal. Waveform 204 is the same as waveform 202.

On the other hand, when measuring instrument 104 determines that the distortion quantity does not fall within the particular range, measuring instrument 104 outputs a control signal indicative of a Low-level signal or a High-level signal to delay device 105b in accordance with the delay amount.

Upon receipt of the control signal indicative of a Low-level signal from measuring instrument 104, delay device 105b generates a Low-level signal as a compensation signal, whereas upon receipt of the control signal indicative of a High-level signal, delay device 105b generates a High-level signal as a compensation signal. Delay device 105a outputs the compensation signal to comparator 105a.

Comparator 105a receives the transmission signal from amplifier 103, and the compensation signal from delay device 105b. Comparator 105a generates a differential signal indicative of the difference between the transmission signal and compensation signal.

Waveform 205 represents the waveform of the differential signal from the transmission signal represented by waveforms 201 and 202. Waveform 205 is the same as waveform 201, since inter-code interference has been eliminated.

Comparator 105a outputs the differential signal to delay device 105b and transversal filter unit 106.

Transversal filter unit 106 compensates for distortion of the differential signal received from comparator 105a, and outputs the differential signal compensated for distortion to output terminal 107.

Output terminal 107 receives the differential signal, and outputs the differential signal.

Next, benefits will be described.

According to this exemplary embodiment, measuring instrument 104 measures the distortion quantity which characterizes distortion of a transmission signal. Comparator 105a generates a differential signal representative of the difference between the transmission signal and compensation signal. Delay device 105b delays the differential signal based on the distortion quantity measured by measuring instrument 104 to generate a compensation signal.

In this event, when a slow-axis wave and a fast-axis wave overlap with each other in the transmission signal to give rise to inter-code interference, the amplitude of the compensation signal can be made substantially the same as the amplitude of the fast-axis wave. For example, when the differential group delay indicative of the distortion quantity is included between 0.85 [UI] and 0.15 [UI], and the branch ratio of optical power is included between 0.4 and 0.6, the amplitude of the compensation signal becomes substantially the same as the amplitude of the fast-axis wave of the transmission signal if the differential signal is delayed by a value included between 0.75 [UI] and 1.25 [UI].

Accordingly, the differential signal indicative of the difference between the transmission signal and compensation signal has an amplitude substantially the same as that of a signal which is generated by subtracting the fast-axis wave from the transmission signal, thus making it possible to eliminate the inter-code interference of the transmission signal. Consequently, even if the prior art encounters difficulties in determining the level of a transmission signal, the level of the transmission signal can be determined. Thus, it is possible to increase the range in which compensation for the distortion of a transmission signal, due to polarization mode dispersion, can be made.

Also, in this exemplary embodiment, measuring instrument 104 measures a distortion quantity and then determines whether or not the distortion quantity falls within the particular range. When measuring instrument 104 determines that the distortion quantity fails within the particular range, delay device 105b delays the differential signal generated by comparator 105a by a predetermined delay amount to generate a compensation signal.

In this event, when the distortion quantity falls within the particular range, the differential signal is delayed by the predetermined delay amount. Thus, more exact compensation for distortion of the transmission signal can be made.

Also, in this exemplary embodiment, the distortion quantity is represented by the differential group delay and the branch ratio of optical power, wherein the particular range is such that the differential group delay is included between N−0.15M [UI] and N+0.15M [UI], and the branch ratio is included between 0.4 and 0.6, where N is an integer equal to or larger than one, and M is one when N is one and two when N is two or more. Also, the delay amount of delay device 105b has a value included between N−0.25 [UI] and N+0.25 [UI].

Also, in this exemplary embodiment, transversal filter unit 106 compensates for distortion of the differential signal generated by comparator 105a.

In this event, more exact compensation for distortion of the transmission signal can be made.

Also, in this exemplary embodiment, transversal filter unit 106a compensates for distortion of a transmission signal received by input terminal 101. Comparator 105a generates a differential signal indicative of the difference between the transmission signal, whose distortion has been compensated for by transversal filter 106a and a compensation signal.

In this event, more exact compensation for distortion of the transmission signal can be made.

Also, in this exemplary embodiment, comparator 105a assumes the transmission signal and compensation signal as ternary signals, and takes a ternary exclusive logical OR of the transmission signal and compensation signal. Comparator 105a generates the result of the operation as the differential signal.

In this event, compensation for distortion of the transmission signal can be readily made.

Next, a second exemplary embodiment will be described.

Figure 7:
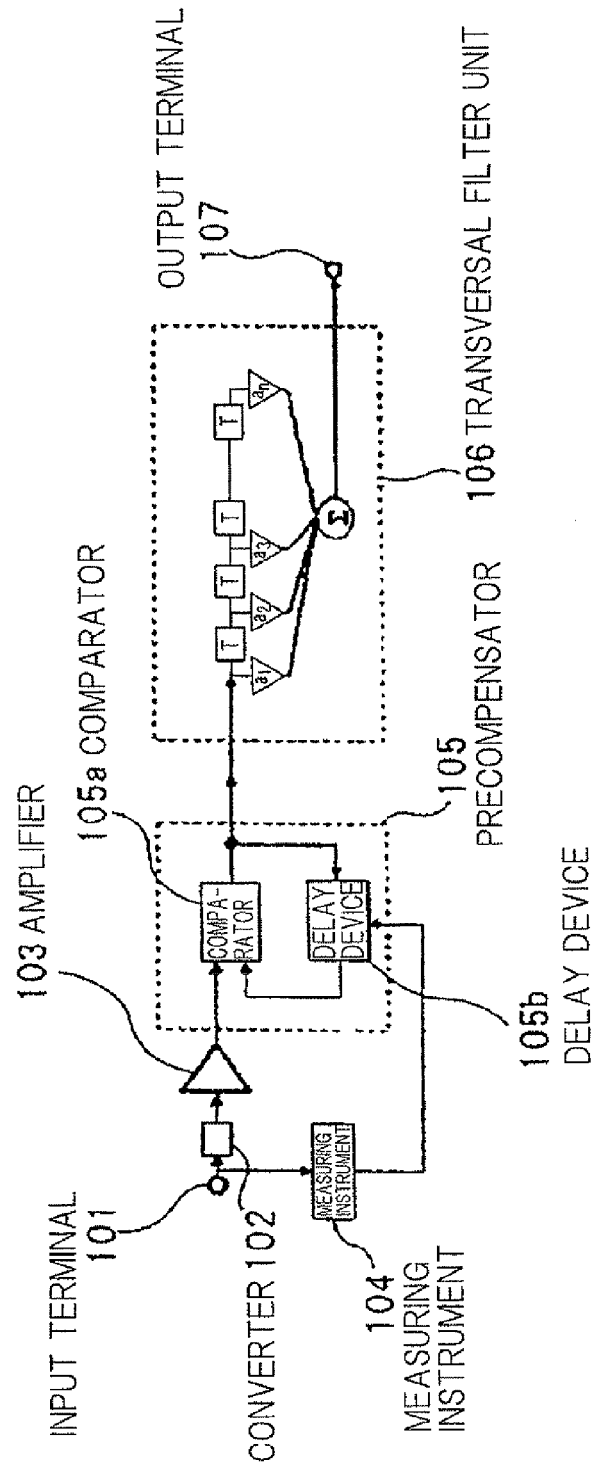
FIG. 7 A block diagram showing the configuration of an equalization filter according to a second exemplary embodiment of the present invention.

FIG. 7 is a block diagram showing the configuration of an equalization filter according to the second exemplary embodiment. The following description will focus mainly on different components from those in FIG. 5A. In this regard, the same components in FIG. 7 as those in FIG. 5A are designated the same reference numerals.

In FIG. 7, delay device 105b provides a variable delay amount.

When measuring instrument 104 determines that a distortion quantity falls within a particular range, measuring instrument 104 adjusts the delay amount of delay device 105b in accordance with the distortion quantity.

Specifically, when the differential group delay is in a range included between N−0.15M [UI] and N+0.15M [UI], and when the branch ratio is in a range included between 0.4 and 0.6, measuring instrument 104 adjusts the delay amount of delay device 105b to a value included between N−0.25 [UI] and N+0.25 [UI].

For example, when the differential group delay is in a range included between 0.85 [UI] and 1.15 [UI], and when the branch ratio is in a range included between 0.4 and 0.6, measuring instrument 104 adjusts the delay amount of delay instrument 105b to a value included between 0.75 [UI] and 1.25 [UI] (equivalent to N=1). Also, when the differential group delay is in a range included between 1.7 [UI] and 2.3 [UI], and when the branch ratio is in a range included between 0.4 and 0.6, measuring instrument 104 adjusts the delay amount of delay device 105b to a value included in a range between 1.75 [UI] and 2.25 [UI] (equivalent to N=2).

Next, the operation will be described.

The following description will mainly focus on the difference in processing different from the processing described in the first exemplary embodiment.

In this regard, assume that as the particular range, the differential group delay is between N−0.15M [UI] and N+1.15M [UI], and the branch ratio is between 0.4 and 0.6.

When a measured distortion quantity is determined to fall within the particular range, measuring instrument 104 calculates the delay amount in accordance with the distortion quantity. For example, measuring instrument 104 calculates a reference number from the distortion quantity, and finds the delay amount in accordance with the reference number.

Figure 8:
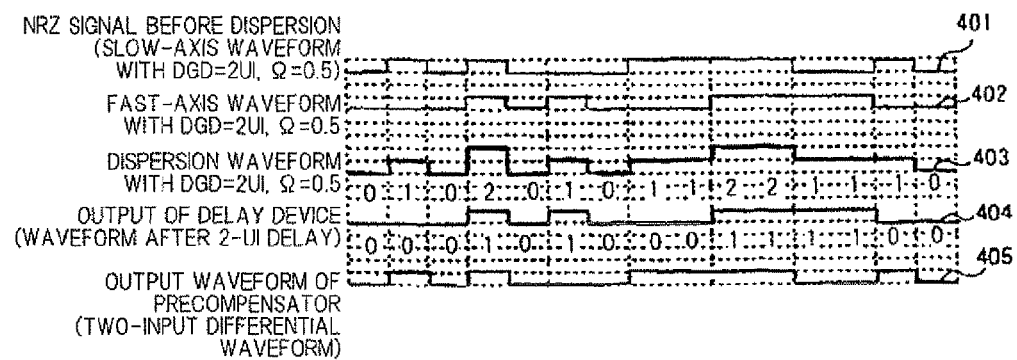
FIG. 8 A signal diagram for describing other exemplary operations of the equalization filter.

FIG. 8 is a signal diagram showing an exemplary transmission signal whose contains a distortion quantity which falls within the particular range. This transmission signal presents the differential group delay equal to 2 [UI] and the branch ratio equal to 0.5.

In FIG. 8, waveform 401 represents the waveform of a slow-axis wave of a transmission signal received by input terminal 101. Waveform 402 represents the waveform of a fast-axis wave of the transmission signal. Notably, waveform 401 is the same as the waveform of the transmission signal before the waveform becomes distorted due to polarization mode dispersion. Waveform 403 represents the waveform of the transmission signal which is converted to an electric signal by converter 102.

In this event, measuring instrument 104 calculates the reference number as two because the differential group delay is included between 1.7 [UI] and 1.3 [UI], and the branch ratio is included between 0.4 and 0.6. Measuring instrument 104 finds a value included between 1.75 [UI] and 2.25 [UI] as the delay amount in accordance with two which is the reference number. In the following, the delay amount is set to 2 [UI].

After finding the delay amount, measuring instrument 104 outputs a delay amount signal indicative of the delay amount and a control signal indicative of a delay to delay device 105b.

Upon receipt of the delay amount signal and control signal, delay device 105b sets the delay amount indicated by the delay amount signal (2 [UI]) to itself. Subsequently, delay device 105b delays the differential signal received from comparator 105a by the set delay amount (2 [UI]) to generate a compensation signal.

Waveform 404 represents the waveform of this compensation signal. Waveform 404 is the same as waveform 402. In this event, waveform 405 representative of the waveform of the differential signal is the same as waveform 401 because inter-code interference has been eliminated.

According to this exemplary embodiment, measuring instrument 104 adjusts a delay amount of delay device 105b in accordance with the measured distortion quantity.

Distortion of a transmission signal varies in response to stress and the like applied to an optical fiber through which the transmission signal passes. This can make it difficult to previously know the appropriate delay amount. In this exemplary embodiment, since the delay amount is adjusted in accordance with the distortion quantity, it is possible to increase a range in which compensation for distortion of a transmission signal, due to polarization mode dispersion, can be made, even if it is difficult to previously known the appropriate delay amount.

Next, a third exemplary embodiment will be described.

Figure 9:
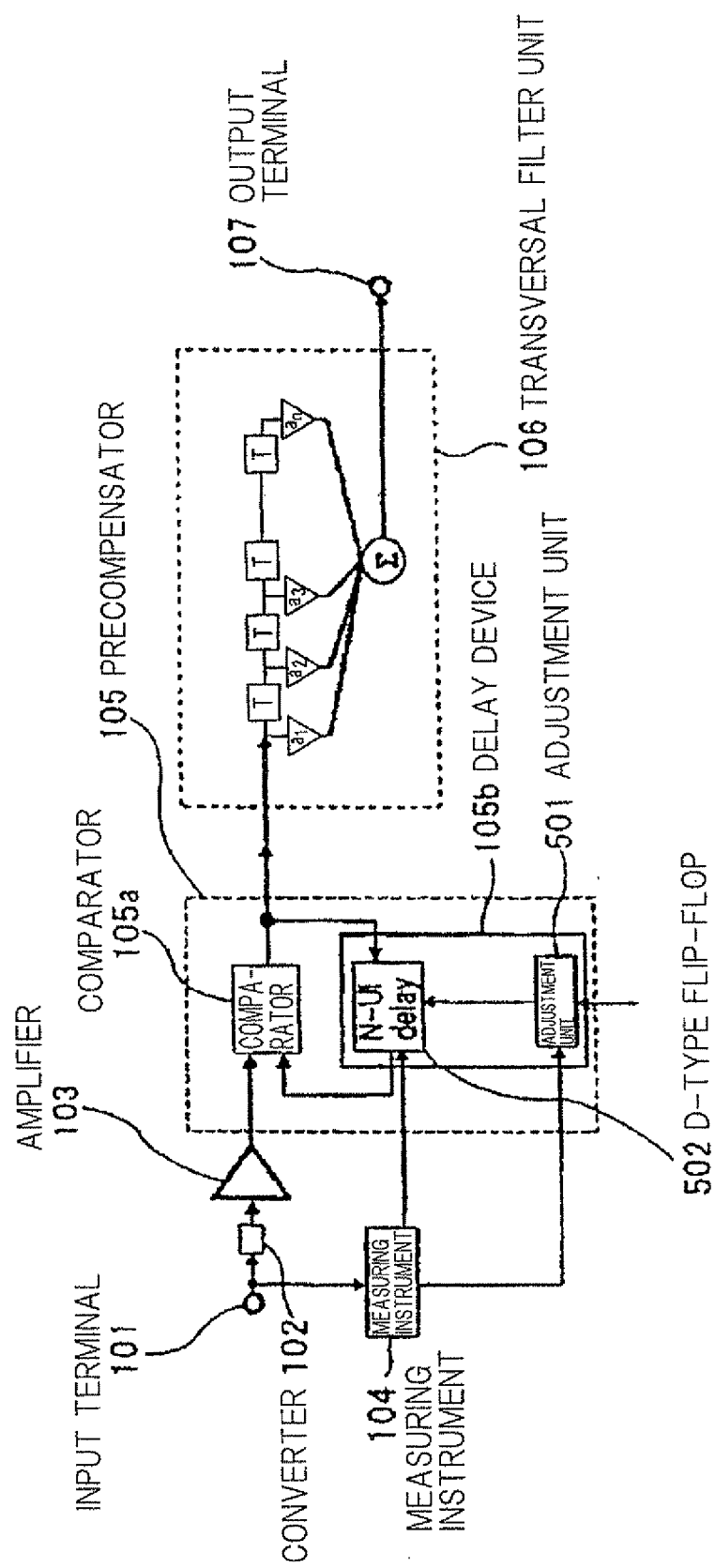
FIG. 9 A block diagram showing the configuration of an equalization filter according to a third exemplary embodiment of the present invention.

FIG. 9 is a block diagram showing the configuration of an equalization filter according to the third exemplary embodiment. The following description will mainly focus on components and processing that see different from those of FIG. 7. In this regard, the same components in FIG. 9 as those in FIG. 7 are designated the same reference numerals.

In FIG. 9, delay device 105b comprises adjustment unit 501 and D-type flip-flop 502. The rest of the configuration is the same as the configuration of the equalization filter shown in FIG. 7.

Adjustment unit 501 receives a clock signal from a clock signal generation unit (not shown) for generating the clock signal, and changes the cycle of the clock signal.

D-type flip-flop 502 is an example of a sample-and-hold type delay unit. However, the sample-and-hold type delay unit is not limited to the D-type flip-flop, but can be changed as appropriate.

When measuring instrument 104 determines that a distortion quantity falls within a particular range, D-type flip-flop 502 fetches a differential signal generated by comparator 105a in synchronization with the clock signal, the cycle of which has been changed by adjustment unit 501, and generates the fetched differential signal as a compensation signal.

On the other hand, when measuring instrument 104 determines that the distortion quantity does not fall within the particular range, D-type flip-flop 502 generates a Low-level signal or a High-level signal in accordance with the distortion quantity as a compensation signal.

After measuring the distortion quantity of a transmission signal, measuring instrument 104 adjusts the cycle of the clock signal, which can be changed by adjustment unit 501, in accordance with the distortion quantity.

For example, when the differential group delay is included between 1.7 [UI] and 2.3 [UI], and the branch ratio is included between 0.4 and 0.6, measuring instrument 104 makes an adjustment such that adjustment unit 501 changes the cycle of the clock signal so that it is twice the original value.

Next, the operation will be described.

The following description will focus mainly on processing which differs from the processing described in the first or second exemplary embodiment.

When a measured distortion quantity is determined to fall within the particular range, measuring instrument 104 finds a cycle of the clock signal which is suitable for the distortion quantity. For example, measuring instrument 104 calculates a reference number from the distortion quantity, and finds the cycle of the clock signal in accordance with the reference number.

This transmission signal is assumed to have waveforms represented by waveforms 201 and 202 in FIG. 6. In this event, since the differential group delay is 1 [UI] and the branch ratio is 0.5, measuring instrument 104 calculates the reference number to be one. Measuring instrument 104 calculates the reference number "1" as the cycle "1 [UI]" of the clock signal.

Measuring instrument 104 outputs a cycle signal indicative of the resulting cycle to adjustment unit 501, and subsequently outputs a control signal indicative of a delay to D-type flip-flop 502.

Adjustment unit 501 receives the clock signal. Upon receipt of the cycle signal from measuring instrument 104, adjustment unit 501 changes the cycle of the clock signal to the cycle indicated by the cycle signal.

Adjustment unit 501 outputs the clock signal, the cycle of which has been changed, to D-type flip-flop 502. When the transmission signal has the waveforms represented by waveforms 201 and 202, adjustment unit 501 outputs the received clock signal to D-type flip-flop 502 because the cycle indicated by the cycle signal is 1 [UI].

Upon receipt of the clock signal from adjustment unit 501 after receiving the control signal indicative of a delay, D-type flip-flop 502 fetches a differential signal output by comparator 105a in synchronization with the clock signal, and generates the differential signal as a compensation signal.

On the other hand, when the distortion quantity is determined not to fall within the particular range, measuring instrument 104 outputs a control signal indicative of a Low-level signal or a High-level signal to D-type flip-flop 502 in accordance with the distortion quantity.

Upon receipt of the control signal indicative of a Low-level signal, D-type flip-flop 502 generates a Low-level signal as a compensation signal. Otherwise, upon receipt of the control signal indicative of a High-level signal, D-type flip-flop 502 generates a High-level signal as a compensation signal. Delay device 105b outputs the compensation signal to comparator 105a.

Comparator 105a receives the transmission signal from amplifier 103, and receives the compensation signal from D-type flip-flop 502. Comparator 105a generates a differential signal indicative of the difference between the transmission signal and compensation signal. Comparator 105a outputs the differential signal to D-type flip-flop 502 and transversal filter unit 106.

According to this exemplary embodiment, adjustment unit 501 changes the cycle of the clock signal. When the distortion quantity measured by measuring instrument 104 falls within the particular range, the D-type flip-flop fetches the differential signal generated by comparator 105a in synchronization with the clock signal, the cycle of which has been changed by adjustment unit 501, and generates the fetched differential signal as a compensation signal. Measuring instrument 104 adjusts the cycle of the clock signal, which is changed by adjustment unit 501, in accordance with the measured distortion quantity.

In this event, the cycle of the clock signal is changed in accordance with the distortion quantity. Also, the differential signal which is fetched in synchronization with the clock signal, the cycle of which has been changed, is output as a compensation signal. In this way, the delay amount can be readily changed.

Next, a fourth exemplary embodiment will be described.

Figure 10:
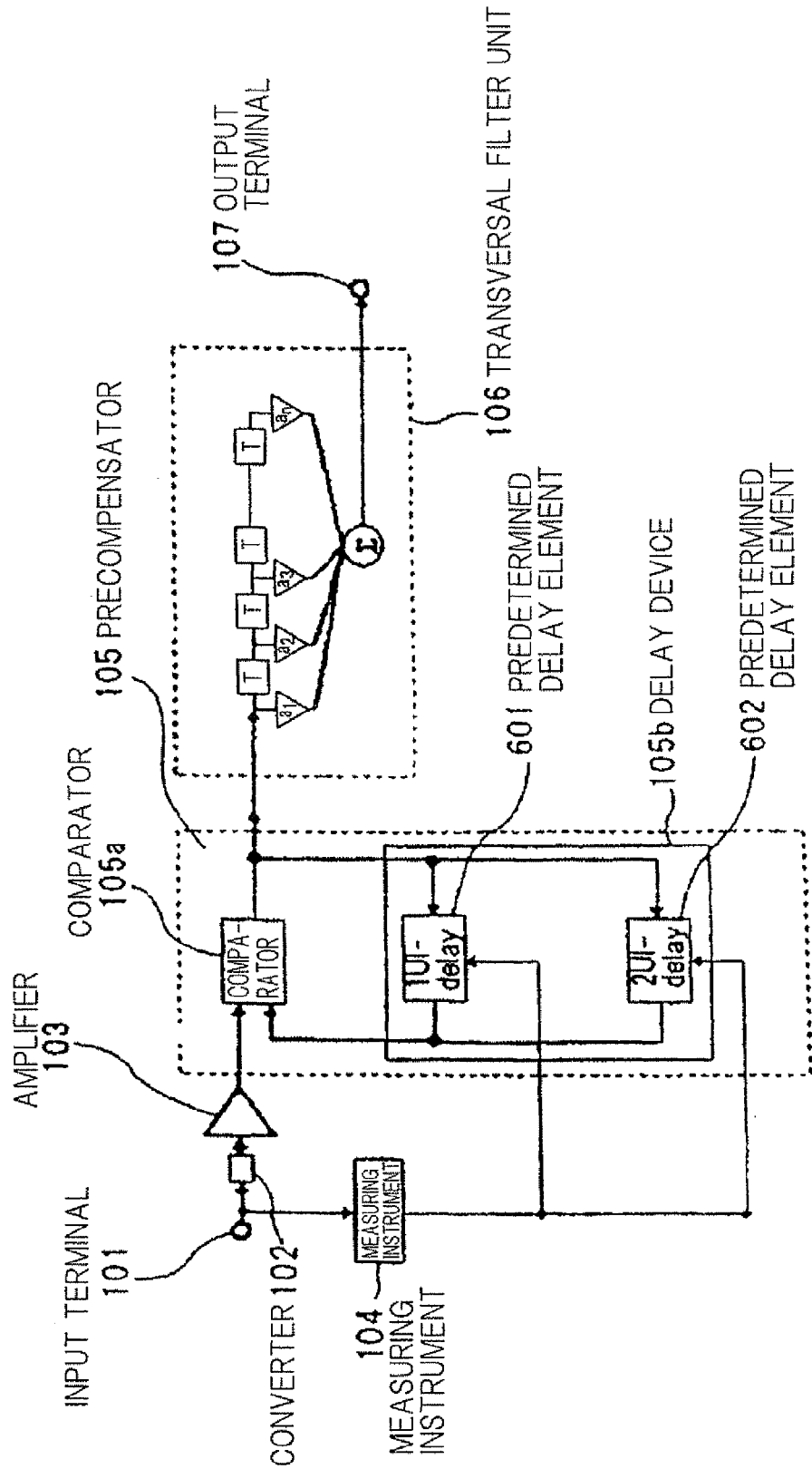
FIG. 10 A block diagram showing the configuration of an equalization filter according to a fourth exemplary embodiment of the present invention.

FIG. 10 is a block diagram showing the configuration of an equalization filter according to the fourth exemplary embodiment. The following description will focus mainly on components and processing different from those of FIG. 7. In this regard, the same components in FIG. 10 as those in FIG. 7 are designated the same reference numerals.

Delay device 105b comprises predetermined delay elements 601 and 602. The rest of the configuration is the same as the configuration of the equalization filter shown in FIG. 7. Also, while the number of the predetermined delay elements is two in this exemplary embodiment, in actuality there may be a plurality of delay elements.

Respective predetermined delay elements 601 and 602 are connected in parallel with each other, and have delay amounts different from each other. In the following, assume that predetermined delay element 601 has a delay amount of 1 [UI], and predetermined delay element 602 has a delay amount of 2 [UI].

When a distortion quantity measured by measuring instrument 104 is determined to fall within a particular range, either predetermined delay element 601 or 602 delays a differential signal generated by comparator 105a to generate a compensation signal.

When measuring instrument 104 determines that the measured distortion quantity falls within the particular range, measuring instrument 104 selects a predetermined delay element which delays the differential signal generated by comparator 105a to generate a compensation signal, in accordance with the measured distortion quantity.

For example, when the differential group delay is included between 0.85 [UI] and 1.15 [UI], and the branch ratio is included between 0.4 and 0.6, measuring instrument 104 selects predetermined delay element 601 which provides a delay amount of 1 [UI]. On the other hand, when the differential group delay is included between 1.7 [UI] and 2.3 [UI], and the branch ratio is included between 0.4 and 0.6, measuring instrument 104 selects predetermined delay element 602 which provides a delay amount of 2 [UI].

Comparator 105a generates a differential signal which indicates the difference between the compensation signal generated by the predetermined delay element selected by measuring instrument 104 and a transmission signal.

Next, the operation will be described.

The following description will focus mainly on processing which differs from the processing described in any of the first through third exemplary embodiments.

When a measured distortion quantity is determined to fall within the particular range, measuring instrument 014 selects a predetermined delay element which delays a differential signal to generate a compensation signal, in accordance with the distortion quantity.

For example, when the differential group delay is 1 [UI] as is the case with the transmission signal shown in FIG. 6, measuring instrument 104 selects predetermined delay element 601. When the differential group delay is 2 [UI] as is the case with the transmission signal shown in FIG. 8, measuring instrument 104 selects predetermined delay element 602.

In the following, assume that predetermined delay element 601 has been selected.

Measuring instrument 104 outputs a control signal indicative of a delay to predetermined delay element 601, and outputs a control signal indicative of a Low-level signal to predetermined delay element 602.

Predetermined delay elements 601 and 602 receive a differential signal from comparator 105a. Upon receipt of the control signal indicative of a delay from measuring instrument 104, predetermined delay element 601 delays the differential signal to generate a compensation signal, and outputs the compensation signal to comparator 105a. On the other hand, upon receipt of the control signal indicative of a Law-level signal from measuring instrument 104, predetermined delay element 602 outputs a Low-level signal to comparator 105a.

On the other hand, when the measured distortion quantity is determined not to fall within the predetermined range, measuring instrument 104 outputs a control signal indicative of a Low-level signal or a High-level signal, in accordance with the distortion quantity, to predetermined delay elements 601 and 602.

Upon receipt of the control signal indicative of a Law-level signal, predetermined delay elements 601 and 602 generate a Low-level signal as a compensation signal. On the other hand, upon receipt of the control signal indicative of a High-level signal, predetermined delay elements 601 and 602 generates a High-level signal as a compensation signal. Delay device 105b outputs the compensation signal to comparator 105a.

According to this exemplary embodiment, predetermined delay elements 601 and 602 have delay amounts that are different from each other. Also, when measuring instrument 104 determines that the distortion quantity falls within the particular range, one of predetermined delay elements 601 and 602 delays the differential signal to generate the compensation signal. Measuring instrument 104 selects a predetermined delay element for to generate the compensation signal in accordance with the measured distortion quantity.

In this event, a predetermined delay element for generating the compensation signal is selected in accordance with the distortion quantity. Thus, a delay amount can be readily adjusted for the delay device.

Next, a fifth exemplary embodiment will be described.

Figure 11:
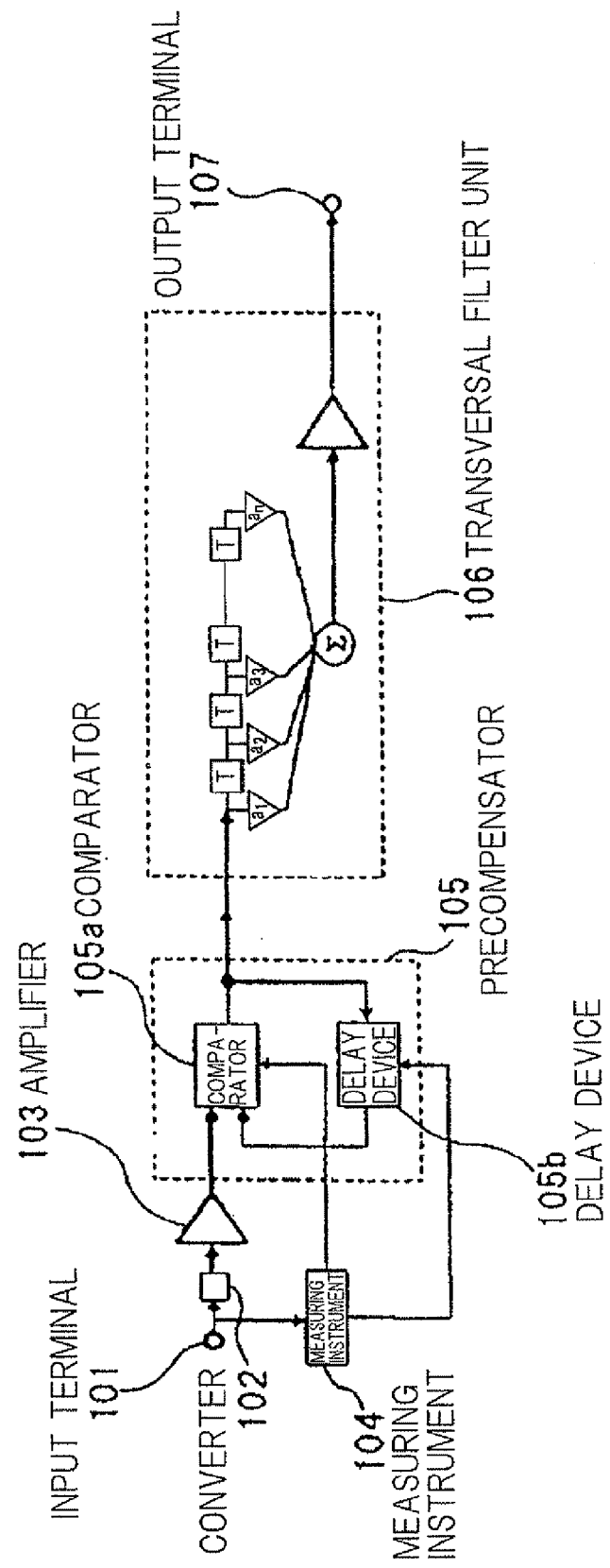
FIG. 11 A block diagram showing the configuration of an equalization filter according to a fifth exemplary embodiment of the present invention.

FIG. 11 is a block diagram showing the configuration of an equalization filter according to the fifth exemplary embodiment. The following description will focus mainly on components and processing that are different from those of FIG. 7. In this regard, the same components in FIG. 11 as those in FIG. 7 are designated the same reference numerals.

Transversal filter unit 106 comprises a transversal filter having an output limit function. In this event, when the amplitude of a differential signal whose distortion has been compensated for is larger than a predetermined output limit value, transversal filter unit 106 limits the amplitude of the differential signal to the output limit value.

Comparator 105a linearly amplifies a transmission signal amplified by amplifier 103 and a compensation signal generated by delay device 105b, and generates a differential signal which indicates the difference between the linearly amplified transmission signal and compensation signal.

An amplification amount of comparator 105a may be previously designed by the designer of the equalization filter, or may be adjusted by measuring instrument 104.

When the amplification amount is adjusted, measuring instrument 104 measures the distortion quantity, and then adjusts the amplification amount of the comparator 105a in accordance with the distortion quantity.

Figure 12:
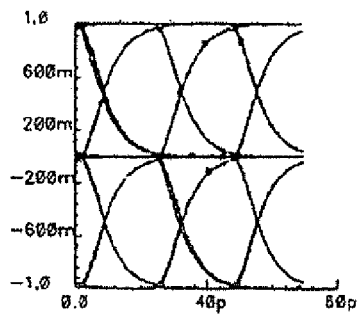
FIG. 12 An explanatory diagram showing an exemplary EYE waveform of an input transmission signal.

FIG. 12 is an explanatory diagram showing an exemplary EYE waveform of a transmission signal received by input terminal 101. The transmission signal having the EYE waveform shown in FIG. 12 presents a differential group delay of 1 [UI] and a branch ratio of 0.5.

In this event, for example, measuring instrument 104 adjusts the amplification amount of comparator 105a for the transmission signal to remain the same, and adjusts the amplification amount of comparator 105a for the compensation signal to be 1.6 times as much. Also, measuring instrument 104 adjusts the delay amount of delay device 105b to a value included between 0.9 and 1.1.

Comparator 105a linearly amplifies the transmission signal and compensation signal by the amplification amounts adjusted by measuring instrument 104. Specifically, comparator 105a amplifies the transmission signal by a factor of one, and the compensation signal by a factor of 1.6.

Comparator 105a generates a differential signal which indicates the difference between the linearly amplified transmission signal and compensation signal. For example, comparator 105a logically inverts the compensation signal amplified by a factor of 1.6, and adds the logically inverted compensation signal and the transmission signal amplified by a factor of one to generate the differential signal.

Figure 13:
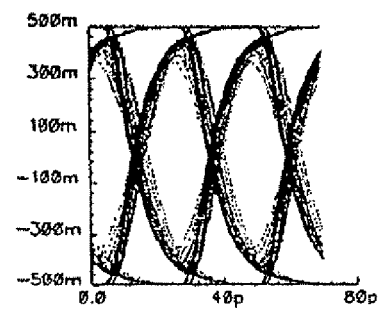
FIG. 13 An explanatory diagram showing an exemplary EYE waveform of an output transmission signal.

FIG. 13 is an explanatory diagram showing an exemplary EYE waveform of a transmission signal (differential signal) output by transversal filter unit 106. Specifically, this EYE waveform is the EYE waveform of a transmission signal output by transversal filter unit 106 when input terminal 101 receives the transmission signal having the EYE waveform shown in FIG. 12.

This EYE waveform is an EYE waveform of the type that enables data to be reproduced from the transmission signal.

Figure 14:
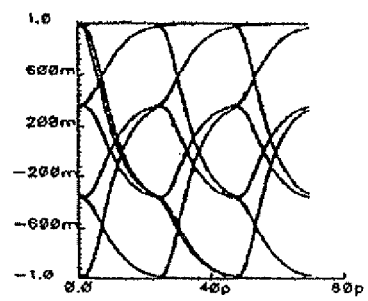
FIG. 14 An explanatory diagram showing another exemplary EYE waveform of an input transmission signal.

FIG. 14 is an explanatory diagram showing another exemplary EYE waveform of a transmission signal received by input terminal 101. The transmission signal having the EYE waveform shown in FIG. 14 presents a differential group delay of 1 [UI] and a branch ratio of 0.3.

In this event, for example, measuring instrument 104 adjusts the amplification amount of comparator 105*a* for the transmission signal to be twice as much, and adjusts the amplification amount of comparator 105*a* for the compensation signal to remain the same. Also, measuring instrument 104 adjust the delay amount of delay device 105*b* to a value included between 0.9 and 1.1.

Figure 15:
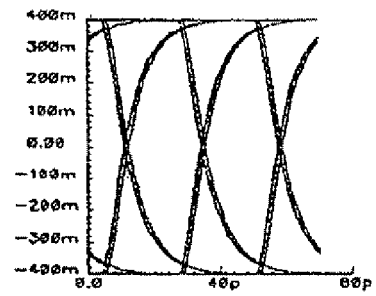
FIG. 15 An explanatory diagram showing another exemplary EYE waveform of an output transmission signal.

FIG. 15 is an explanatory diagram showing an EYE waveform of a transmission signal (differential signal) output by transversal filter unit 106. Specifically, this EYE waveform is the EYE waveform of a transmission signal output by transversal filter unit 106 when input terminal 101 receives the transmission signal having the EYE waveform shown in FIG. 14. In this regard, a parameter of transversal filter unit 106 which compensates for distortion is fixed. This EYE waveform is such an EYE waveform that enables data to be reproduced from the transmission signal.

In this way, by linearly amplifying the transmission signal and compensation signal, the waveform of the differential signal can be transformed into a waveform suitable for reproducing data.

It should be understood that the values of the amplification amounts of comparator 105*a* and the delay amount of delay device 105*a*, to compensate the distortion of the transmission signals that have the EYE waveforms shown in FIGS. 12 and 14, are illustrative, and, not limited to these values, they may be such values that enable data to be reproduced from the transmission signal output by transversal filter unit 106.

Next, the operation will be described.

The following description will focus mainly on processing which differs from the processing described in any of the first through fourth exemplary embodiments.

Measuring instrument 104 measures a distortion quantity, and then finds the amplification amounts of comparator 105 in accordance with the distortion quantity. For example, when the differential group delay is 1 UI and the branch ratio is 0.5, measuring instrument 104 determines the amplification amount of comparator 105*a* for a transmission signal to remain the same, and determines the amplification amount of comparator 105*a* for a compensation signal to be 1.6 times. Also, measuring instrument 104 determines the delay amount of delay device 105*b* to be a value included in a range from 0.9 to 1.1.

After determining the amplification amounts for the transmission signal and compensation signal, measuring instrument 104 outputs a transmission amplification amount signal indicative of the amplification amount for the transmission signal and a compensation amplification amount signal indicative of the amplification amount for the compensation signal to comparator 105*a*.

Upon receipt of the transmission amplification amount signal and compensation amplification amount signal, comparator 105*a* sets the amplification amount indicated by that transmission amplification amount signal as an amplification amount for the transmission signal, and sets the amplification amount indicted by that compensation amplification amount signal as an amplification amount for the compensation signal.

Subsequently, upon receipt of the transmission signal and compensation signal, comparator 105*a* linearly amplifies the transmission signal by the amplification amount set for the transmission signal, and linearly amplifies the compensation signal by the amplification amount set for the compensation signal.

Comparator 105*a* generates a differential signal which indicates the difference between the linearly amplified transmission signal and compensation signal.

In this regard, while this exemplary embodiment has been described for a case where the differential group delay is 1 [UI] and the branch ratio varies, it should be apparent that waveform distortion of the transmission signal can be compensated for by adjusting the amplification amounts of comparator 105*a* even if the differential group delay varies.

According to this exemplary embodiment, comparator 105*a* linearly amplifies the transmission signal and compensation signal, and generates a differential signal of the linearly amplified transmission signal and compensation signal.

In this event, the generated differential signal represents the difference between the linearly amplified transmission signal and the compensation signal. Thus, the amplitude of the differential signal can be set to an appropriate value, and the waveform of the differential signal can be transformed into a waveform suitable for the reproduction of data.

Also, in this exemplary embodiment, measuring instrument 104 adjusts the amplification amounts of comparator 105*a* in accordance with the measured distortion quantity.

In some cases, it is difficult to previously know appropriate values for the amplification amounts. In this exemplary embodiment, the amplification amounts are adjusted in accordance with a distortion quantity. Thus, even if it is difficult to previously know appropriate values for the amplification amounts, the waveform of the differential signal can be transformed into a waveform suitable for the reproduction of data.

Next, a sixth exemplary embodiment will be described.

Figure 16:
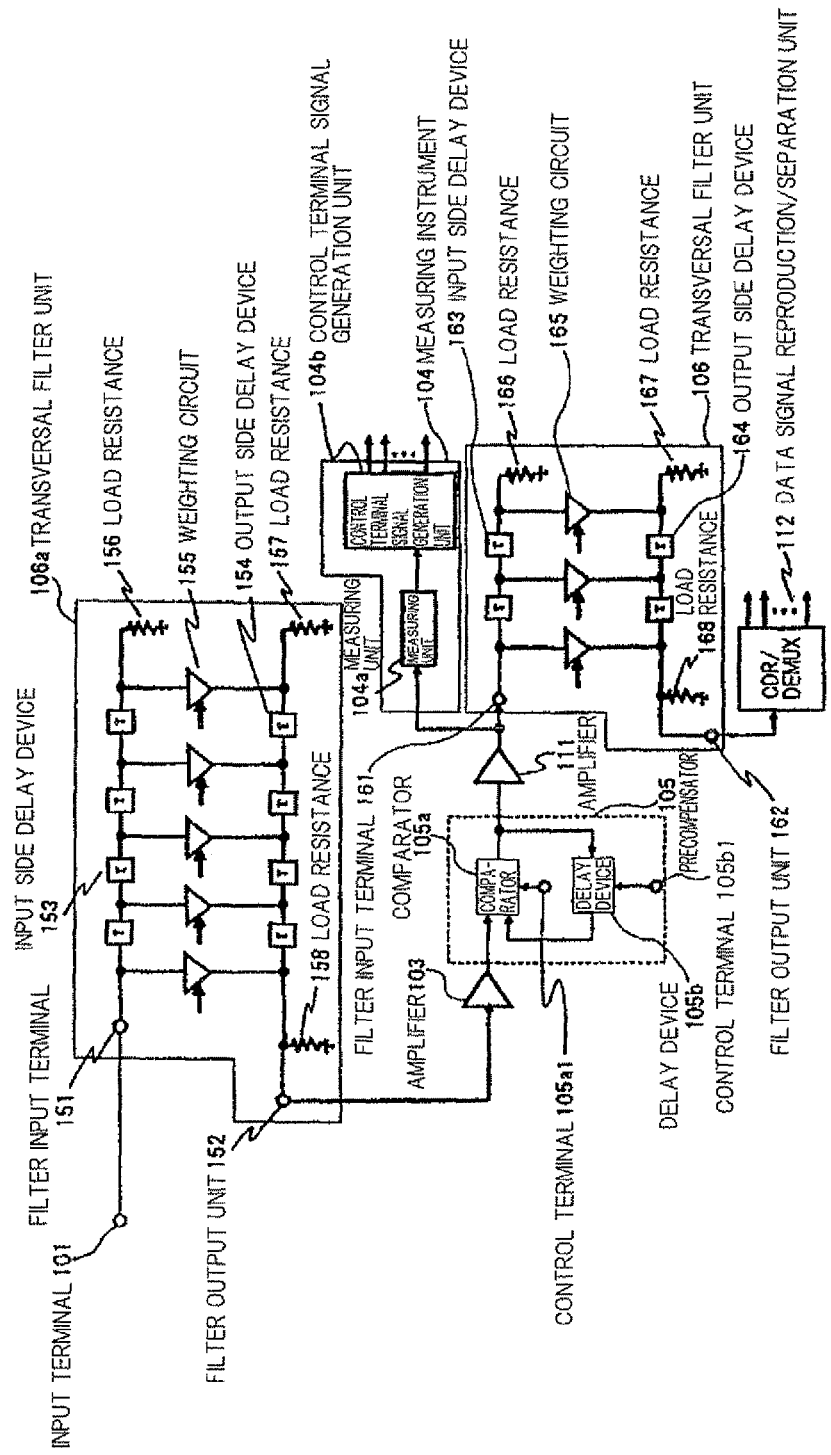
FIG. 16 A block diagram showing the configuration of an equalization filter according to a sixth exemplary embodiment of the present invention.

FIG. 16 is a block diagram showing the configuration of an equalization filter according to the sixth exemplary embodiment. The following description will focus mainly on components and processing that are different from those of FIGS. 5, 7, and 11. In this regard, the same components in FIG. 16 as those in FIGS. 5B and 7 are designated the same reference numerals.

In FIG. 16, the equalization filter comprises input terminal 101, amplifier 103, measuring instrument 104, precompensator 105, transversal filter unit 106, transversal filter unit 106*a*, output terminal 107, amplifier 111, and data signal reproduction/separation unit 112.

Amplifier 111 amplifies a differential signal generated by comparator 105*a*.

Data signal reproduction/separation unit (hereinafter referred to as "reproduction/separation unit") 112 reproduces a differential signal whose distortion has been compensated for by transversal filter unit 106.

Input terminal 101 receives an electric transmission signal. In this regard, a converter (not shown) receives an optical transmission signal from a transmitter through an optical fiber. The converter converts the optical transmission signal to an electric signal, and outputs the transmission signal converted to the electric signal. Assume that input terminal 101 receives the electronic transmission signal from the converter.

Amplifier 103 amplifies the transmission signal whose distortion has been compensated for by transversal filter unit 106*a*.

Measuring instrument 104 comprises measuring unit 104a and control terminal signal generation unit 104b.

Measuring unit 104a is, for example, a sampling oscilloscope, and evaluates the waveform of a differential signal output by comparator 105a. Specifically, measuring unit 104a intermittently examines a differential signal amplified by amplifier 111 for a certain period, and evaluates the waveform of the differential signal output by amplifier 111 based on the result of the examination.

Control terminal signal generation unit 104b estimates a current distortion quantity based on the result of the evaluation by measuring unit 104a. Control terminal signal generation unit 104b adjusts the amplification amounts of comparator 105a and the delay amount of delay device 105b in accordance with the estimated distortion quantity.

Subsequently, control terminal signal generation unit 104b adjusts the amplification amounts of comparator 105a and the delay amount of delay device 105b based on the result of the evaluation by measuring unit 104a, the amplification amounts of comparator 105a, and the delay amount of delay device 105b.

In this way, measuring instrument 104 adjusts the amplification amounts of comparator 105a and the delay amount of delay device 105 through feedback control.

Precompensator 105 comprises control terminal 105a1 and control terminal 105b1 in addition to comparator 105a and delay device 105b. Comparator 105a is connected to control terminal 105a1, while delay device 105b is connected to control terminal 105b1.

Control terminals 105a1 and 105b1 are connected to control terminal signal generation unit 104b.

Transversal filter unit 106a comprises filter input terminal 151, filter output unit 152, input side delay device 153, output side delay device 154, weighting circuit 155, and load resistances 156 and 158.

Figure 1:
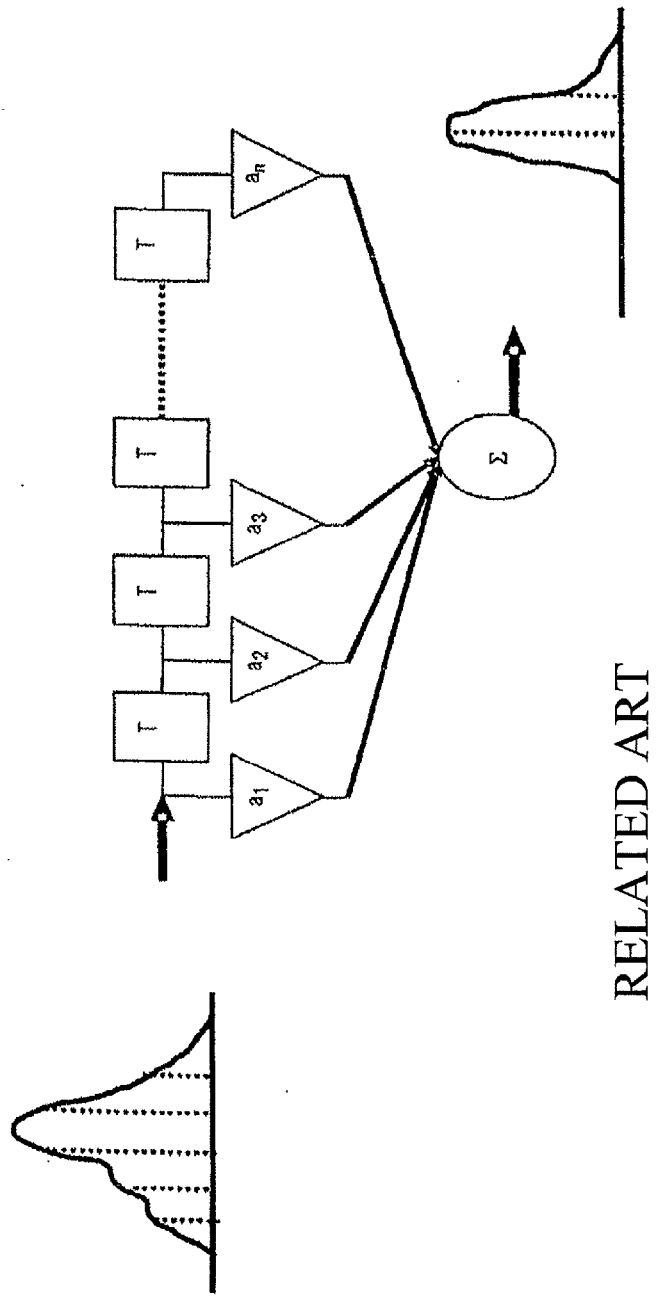
FIG. 1 A schematic diagram showing the configuration of a related transversal filter.
Figure 2:
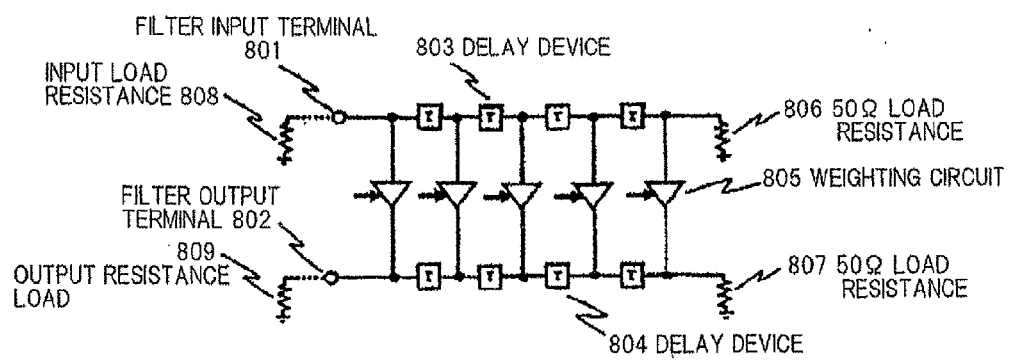
FIG. 2 A circuit diagram showing the configuration of a related transversal filter.
Figure 3:
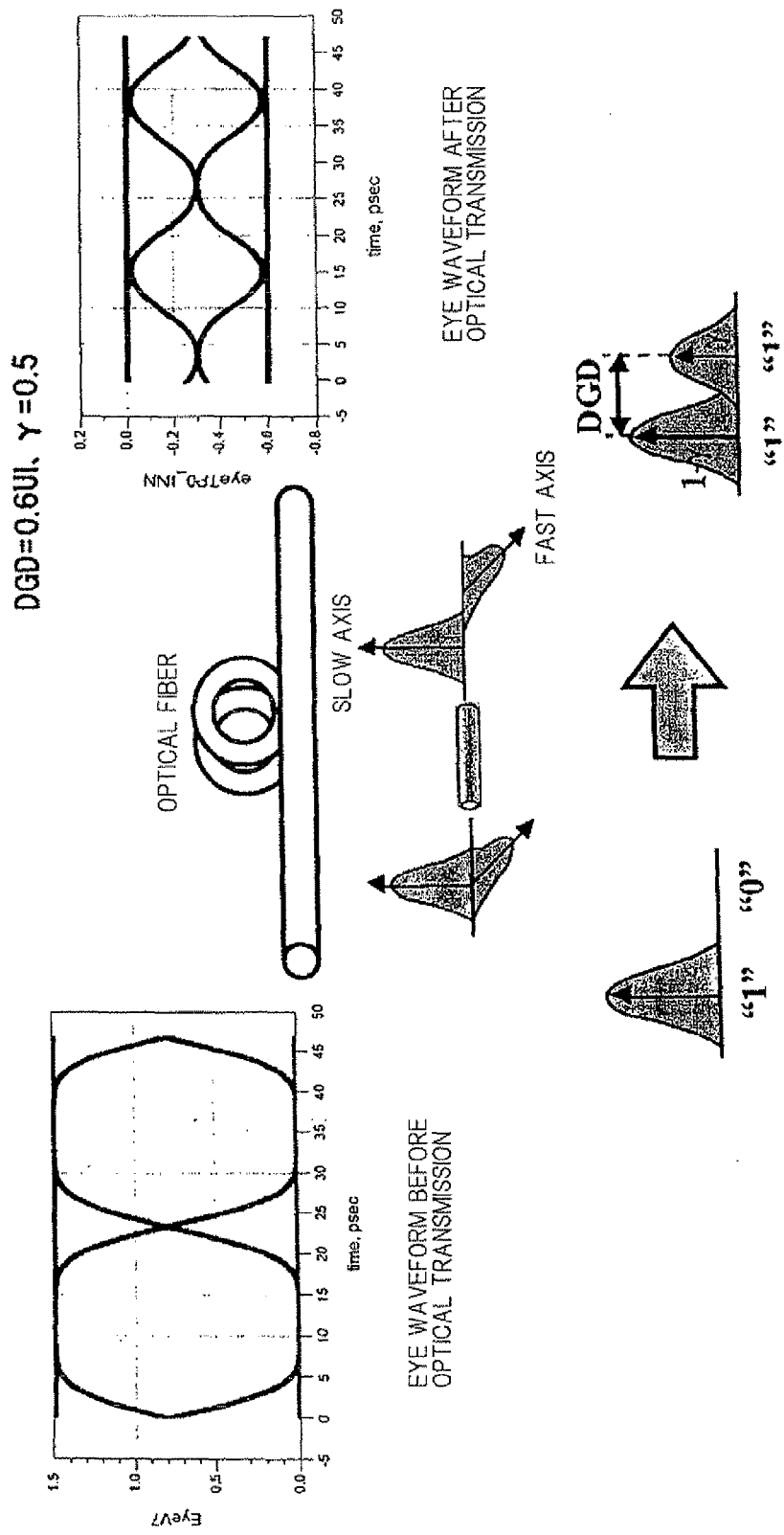
FIG. 3 A schematic diagram showing distortion of a transmission signal due to polarization mode dispersion.
Figure 4:
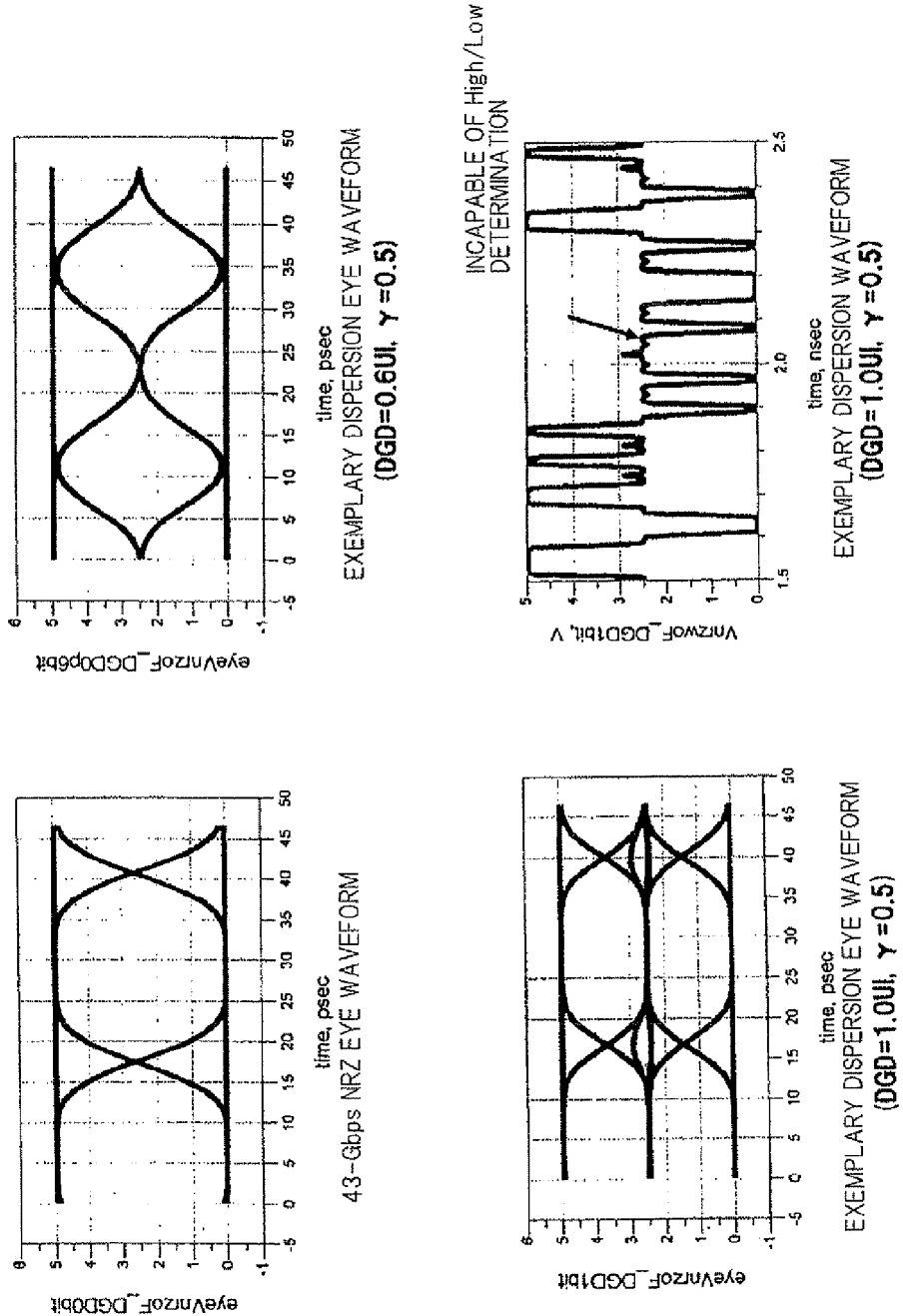
FIG. 4 An explanatory diagram showing behaviors of a transmission signal.

In this regard, filter input terminal 151, filter output unit 152, input side delay device 153, output side delay device 154, weighting circuit 155, and load resistances 156 and 158 have the same functions as filter input terminal 801, filter output terminal 802, delay device 803, delay device 804, weighting circuit 805, 50Ω load resistances 806 and 807, and output load resistance 809, respectively, of the transversal filter shown in FIG. 2. Input load resistance 808 is not shown. Since the operation of each component in this transversal filter unit 106a remains unchanged from conventional operation, and is obvious to those skilled in the art, detailed descriptions thereon are omitted.

Additionally, filter output unit 152 may be provided with an output limit function.

Transversal filter unit 106a compensates for distortion of a transmission signal received by input terminal 101. Specifically, transversal filter unit 106a mainly compensates for distortion that his different from distortion caused by polarization mode dispersion, such as distortion due to wavelength dispersion which can occur during optical transmission, distortion due to electric reflection, loss and the like which can occur during electric transmission, and the like.

In this way, even if a transmission signal has distortion due to polarization mode dispersion and distortion that is different from the distortion due to the polarization mode dispersion, the distortion of the transmission signal applied to precompensator 105 can be reduced only to the distortion due to the polarization mode dispersion, for example, as the transmission signal having the EYE waveform shown in FIG. 12 or 14.

Transversal filter unit 106 comprises filter input terminal 161, filter output unit 162, input side delay device 163, output side delay device 164, weighting circuit 165, and load resistances 166 and 168.

In this regard, filter input terminal 161, filter output unit 162, input side delay device 163, output side delay device 164, weighting circuit 165, and load resistances 166 and 168 have the same functions as filter input terminal 801, filter output terminal 802, delay device 803, delay device 804, weighting circuit 805, 50Ω load resistances 806 and 807, and output load resistance 809, respectively, of the transversal filter shown in FIG. 2. Input load resistance 808 is not shown. Since the operation of each component in this transversal filter unit 106 remains unchanged from conventional operation, and is obvious to those skilled in the art, detailed descriptions thereon are omitted.

Additionally, filter output unit 162 may be provided with an output limit function.

Transversal filter unit 106 compensates for distortion of the differential signal amplified by amplifier 111. Specifically, transversal filter 106 mainly compensates a differential signal for distortion due to polarization mode dispersion when a distortion quantity of a transmission signal does not fall within a particular range.

Here, a parameter of transversal filter unit 106 for correcting a transmission signal for distortion has a fixed value. The fixed value is preferably such a value which can maximally compensate for the distortion.

The parameter may be, for example, a filter coefficient of transversal filter unit 106, a delay amount of each of a plurality of delay devices contained in transversal filter unit 106, an output limit value of transversal filter unit 106, and the like.

For example, when input terminal 101 receives the transmission signal having the EYE waveform shown in FIG. 12, measuring instrument 104a evaluates the waveform of the transmission signal. Control terminal signal generation unit 104b estimates that the differential group delay is 1 [UI] and the branch ratio is 0.5 based on the waveform of the differential signal.

Control terminal signal generation unit 104b adjusts the delay amount of delay device 105b to a value included between 0.9 [UI] and 1.1 [UI]. Also, control terminal signal generation unit 104b adjusts the amplification amount of comparator 105a for the transmission signal to remain the same, and adjusts the amplification amount of comparator 105a for the compensation signal to be 1.5 times as much.

In this event, the EYE waveform of the differential signal whose distortion has been compensated for by transversal filter unit 106 is like the EYE waveform shown in FIG. 13.

With the differential signal having this EYE waveform, reproduction/separation unit 112 can reproduce error free data from the differential signal.

For example, when input terminal 101 receives the transmission signal having the EYE waveform shown in FIG. 14, measuring instrument 104a evaluates the waveform of the transmission signal. Control terminal signal generation unit 104b estimates, based on the waveform of the differential signal, that the differential group delay is 1 [UI], and the branch ratio is 0.3.

Control terminal signal generation unit 104b controls delay device 105b so as to generate a Low-level signal as a compensation signal. Also, control terminal signal generation unit 104b adjusts the amplification amount of comparator 105a for the transmission signal to increase by a factor of two, and adjusts the amplification amount of comparator 105a for the compensation signal to remain the same.

Comparator 105a linearly amplifies the transmission signal and compensation signal by the amplification amounts adjusted by measuring instrument 104. Comparator 105a generates a differential signal which indicates the difference between the linearly amplified transmission signal and compensation signal. Notably, since the compensation signal is a Low-level signal, this differential signal is the same as the linearly amplified transmission signal.

In this event, the differential signal whose distortion has been compensated for by transversal filter unit 106 has an EYE waveform which suffers from larger distortion such as jitter, as compared with the signal having the EYE waveform shown in FIG. 14. However, even in this event, reproduction/separation unit 112 can reproduce error free data from this differential signal.

Incidentally, while the parameter of transversal filter unit 106 has a fixed value, the parameter of transversal filter unit 106a may have fixed value. In this event, transversal filter unit 106 mainly compensates for distortion that is different from distortion due to polarization mode dispersion, while transversal filter unit 106a mainly compensates for distortion of the differential signal due to polarization mode dispersion when a transmission signal has a distortion quantity which does not fall within the particular range.

Next, the operation will be described.

Upon receipt of a transmission signal, input terminal 101 outputs the transmission signal to transversal filter unit 106a.

Upon receipt of the transmission signal, transversal filter unit 106a compensates for distortion of the transmission signal, and outputs the transmission signal whose distortion has been compensated for to amplifier 103. Specifically, transversal filter unit 106a compensates for distortion different from distortion due to polarization mode dispersion.

Upon receipt of the transmission signal from transversal filter unit 106a, amplifier 103 amplifies the transmission signal. Amplifier 103 outputs the amplified transmission signal to precompensator 105.

Upon receipt of the transmission signal, precompensator 105 compensates for distortion of the transmission signal to generate a differential signal. Precompensator 105 outputs the differential signal to amplifier 111.

Upon receipt of the differential signal, amplifier 111 amplifies the differential signal. Amplifier 111 outputs the amplified differential signal to measuring unit 104a and transversal filter unit 106.

Upon receipt of the differential signal, measuring unit 104a evaluates the waveform of the differential signal. Measuring unit 104a outputs the result of the evaluation to control terminal signal generation unit 104b.

Upon receipt of the result of the evaluation, control terminal signal generation unit 104b estimates the distortion quantity of the transmission signal based on the result of the evaluation, the amplification amounts of comparator 105a, and the delay amount of delay device 105b. In this regard, assume that control terminal signal generation unit 104b holds the amplification amounts and delay amount.

Control terminal signal generation unit 104b calculates the amplification amounts of comparator 105a, and the delay amount of delay device 105b based on the distortion quantity. Control terminal signal generation unit 104b generates an amplification amount signal indicative of the amplification amounts, a delay amount signal indicative of the delay amount, and a control signal.

Specifically, when the calculated delay amount is a non-zero value, control terminal signal generation unit 104b generates a control signal indicative of a delay, and a delay amount signal. When the calculated delay amount is zero, control terminal signal generation unit 104b generates a control signal indicative of a Low-level signal without generating a delay amount signal indicative of the delay amount.

Control terminal signal generation unit 104b outputs the amplification amount signal to comparator 105a through control terminal 105a1. Also, control terminal signal generation unit 104b outputs the delay amount signal to delay device 105b through control terminal 105b1.

Upon receipt of the differential signal, transversal filter unit 106 compensates for distortion of the differential signal, and outputs the differential signal whose distortion has been compensated for to reproduction/separation unit 112.

Upon receipt of the differential signal, reproduction/separation unit 112 reproduces data from the differential signal.

In this exemplary embodiment, a parameter of transversal filter unit 106 or 106a for compensating for distortion has a fixed value.

In this event, it is possible to reduce the number of circuits which must be adjusted to compensate for distortion of a transmission signal, and to improve the responsivity to variations in distortion of the transmission signal.

For reference, in each exemplary embodiment, converter 102, amplifiers 103 and 111, measuring instrument 104, transversal filter units 106 and 106a, comparator 105a, delay device 105b and reproduction/separation unit 112, and the like are composed using semiconductor devices such as bipolar transistors, field effect transistors, and MOS transistors. Since these components are obvious to those skilled in the art, detailed descriptions thereon are omitted.

According to the exemplary embodiments described above, a differential signal is generated to indicate the difference between a transmission signal and a compensation signal. Also, the differential signal is delayed based on the distortion quantity which characterizes distortion of the transmission signal to generate the compensation signal.

When a transmission signal suffers from inter-code interference due to a slow-axis wave overlapping with a fast-axis wave, the compensation signal can be generated to have an amplitude substantially the same as that of the fast-axis wave. For example, when a differential group delay indicative of the distortion quantity is included between 0.85 [UI] and 0.15 [UI], and a branch ratio of optical power is included between 0.4 and 0.6, the compensation signal has an amplitude substantially the same as that of the fast-axis wave of the transmission signal when the differential signal is delayed by a value included between 0.75 [UI] and 1.25 [UI].

Accordingly, the differential signal indicative of the difference between the transmission signal and compensation signal has an amplitude substantially the same as that of a signal which is generated by subtracting the fast-axis wave from the transmission signal, thus making it possible to eliminate the inter-code interference of the transmission signal. Therefore, it is possible to determine the level of a transmission signal even if the determination on the level of the transmission signal has been difficult in the past, making it possible to increase the range in which compensated for distortion of a transmission signal, due to polarization mode dispersion, can be made.

Also preferably, the measuring unit measures the distortion quantity, and then determines whether or not the distortion quantity falls within a particular range, and the generation unit delays the differential signal by a predetermined delay amount when the measuring unit determines that the distortion quantity falls within the particular range.

According to the exemplary embodiments described above, when the distortion quantity falls within the particular range, the differential signal is delayed by the predetermined delay amount. Consequently, more exact compensation for distortion of the transmission signal can be made.

Also preferably, when the distortion quantity is determined to fall within the particular range, the measuring unit adjusts the delay amount of the generation unit in accordance with the distortion quantity.

Distortion of a transmission signal varies in accordance with stress and the like applied to an optical fiber through which the transmission signal passes. For this reason, it is sometimes difficult to previously know the appropriate delay amount.

According to the exemplary embodiments described above, the delay amount is adjusted in accordance with the distortion quantity. It is therefore possible to increase the range in which compensated for distortion of the transmission signal, due to polarization mode dispersion, even if it is difficult to previously known the appropriate delay amount.

Also, the generation unit comprises an adjustment unit for changing the cycle of a clock signal, and a sample-and-hold type delay unit responsive to the measuring unit which determines that the distortion quantity falls within the particular range for fetching a differential signal generated by the compensation unit in synchronization with the clock signal, the cycle of which has been changed by the adjustment unit, and generating the fetched differential signal as the compensation signal, wherein the measuring unit preferably adjusts the cycle of the clock signal changed by the adjustment unit in accordance with the measured distortion quantity.

According to the exemplary embodiments described above, the cycle of the clock signal can be changed in accordance with a distortion quantity. Also, the differential signal, which is fetched in synchronization with the clock signal, the cycle of which has been changed, is generated as the compensation signal. Thus, the delay amount can be readily adjusted.

Also, the generation unit comprises a plurality of predetermined delay elements which have different delay amounts from one another, and one of which delays the differential signal to generate the compensation signal when the measuring unit determines that the distortion quantity falls within the particular range, wherein the measuring unit preferably selects a predetermined delay element to generate the compensation signal in accordance with the measured distortion quantity.

According to the exemplary embodiments described above, a predetermined delay element for generating the compensation signal is selected in accordance with the distortion quantity. Thus, a delay amount can be readily adjusted.

Also, the distortion quantity is preferably represented by a differential group delay and a branch ratio of optical power.

Also, when N is an integer equal to or larger than one, and M is one when N is one and is two when N is two or more, the particular range is such that the differential group delay is included between N−0.15M [UI] and N+0.15M [UI], and the branch ratio is included between 0.4 and 0.6, and the delay amount of the differential signal is preferably a value included between N−0.25 [UI] and N+0.25 [UI].

Also, a rear-stage filter unit is preferably included for compensating for distortion of differential signal generated by the compensation unit.

According to the exemplary embodiments described above, a transmission signal can be more exactly compensated for distortion.

Also, the rear-stage filter unit preferably includes at least one feed forward type equalization filter, or at least one feedback type equalization filter.

Also preferably, a front-stage filter unit is included for compensating for distortion of a transmission signal received by the input unit, wherein the generation unit generates a differential signal which indicates the difference between the transmission signal whose for distortion has been compensated for by the front-stage filter unit and the compensation signal.

According to the exemplary embodiments described above, more exact compensation for distortion of the transmission signal can be.

Also, the front-stage filter unit preferably includes at least one feed forward type equalization filter, or at least one feedback type equalization filter.

Also preferably, the compensation unit linearly amplifies the transmission signal and the compensation signal, and generates a differential signal which indicates the difference between the linearly amplified transmission signal and compensation signal.

In Particular, when a transmission signal is an analog signal, the amplitude of the differential signal may be excessively large or excessively small. For this reason, the waveform of the differential signal can become unsuitable for reproducing data.

According to the exemplary embodiments described above, a differential signal is generated to indicate the difference between the linearly amplified transmission signal and compensation signal. It is therefore possible to set the amplitude of the differential signal to an appropriate value, and make the waveform of the differential signal suitable for the reproduction of data.

Also, the measuring unit preferably adjusts the amplification amount of the compensation unit in accordance with the measured distortion quantity.

It is sometimes difficult to previously know the appropriate value for the amplification amount.

According to the exemplary embodiments described above, the amplification amount is adjusted in accordance with the distortion quantity. Accordingly, the waveform of the differential signal can be made suitable for the reproduction of data even if it is difficult to previously know an appropriate value for the amplification amount.

Preferably, a parameter of the rear-stage filter unit for compensating for distortion of the transmission signal is a fixed value, and the compensation unit generates linearly amplifies the transmission signal and the compensation signal, and generates a differential signal which indicates the difference between the linearly amplified transmission signal and the compensation signal, and the measuring unit adjusts the amplification amount of the compensation unit in accordance with the measured distortion quantity.

For example, a filter coefficient representative of the parameter varies in response to adjustments made to respective amplification amounts of a plurality of amplifiers included in the rear-stage filter unit When distortion of a transmission signal varies over time, a conventional equalization filter varies a parameter over time to compensate for distortion of the transmission signal. For this reason, a large number of circuits must be adjusted to compensate for distortion of the transmission signal, resulting in longer response times from the circuits. Consequently, poor responsivity has been presented for variations in distortion of transmission signal.

According to the exemplary embodiments described above, the parameter has a fixed value. The amplification amount is adjusted in accordance with the distortion quantity. It is therefore possible to reduce the number of circuits which must be adjusted to compensate a transmission signal for distortion, making it possible to improve the responsivity to variations in distortion of the transmission signal.

Also preferably, a parameter of the front-stage filter unit for compensating for distortion of the transmission signal has a fixed value, wherein the compensation unit linearly amplifies the transmission signal and the compensation signal, and generates a differential signal which indicates the difference between the linearly amplified transmission signal and compensation signal, and the measuring unit adjusts the amplification amount of the compensation unit in accordance with the measured distortion quantity.

For example, a filter coefficient representative of the parameter varies in response to adjustments made to respective amplification amounts of a plurality of amplifiers included in the rear-stage filter unit. When distortion of a transmission signal varies over time, a conventional equalization filter varies a parameter over time to compensate for distortion of the transmission signal. For this reason, a large number of circuits must be adjusted to compensate for distortion of the transmission signal, resulting in longer response times from the circuits. Consequently, a poor responsivity has been presented for variations in distortion of transmission signal.

According to the exemplary embodiments described above, the parameter has a fixed value. The amplification amount is adjusted in accordance with the distortion quantity. It is therefore possible to reduce the number of circuits which must be adjusted to compensate for distortion of a transmission signal, making it possible to improve responsivity to variations in distortion of the transmission signal.

Also preferably, the generation unit assumes the transmission signal and compensation signal as ternary signals, and uses a ternary exclusive logical OR of the transmission signal and compensation signal to generate the result of the operation as the differential signal.

According to the exemplary embodiments described above, more exact compensation for distortion of the transmission signal can be made.

In each of the exemplary embodiments described above, the illustrated configuration is merely exemplary, and the present invention is not limited to that configuration.

For example, delay device 105b may be an A/D converter for performing an analog-to-digital conversion when a transmission signal is an analog signal. In this event, measuring instrument 104 adjusts the output timing of the transmission signal converted to a digital signal to adjust the delay amount of delay device 105b.

Also, while the transmission signal has been described to be a single-phase signal in each exemplary embodiment, the transmission signal may be a differential signal. In this event, an equalization filter can be used for every two signals of the differential signal to compensate for distortion of the differential signal.

This application claims priority based on Japanese Patent Application No. 2006-341274 filed Dec. 19, 2006, the disclosure of which is incorporated herein by reference in its entirety.

The invention claimed is:

1. An equalization filter comprising an input unit for receiving a transmission signal, a generation unit for generating a compensation signal for compensating for distortion of the transmission signal, and a compensation unit for compensating for distortion of the transmission signal based on the compensation signal, further comprising;

a measuring unit is included for measuring a distortion quantity which characterizes the distortion of the transmission signal wherein:

said compensation unit generates a differential signal which indicates the difference between the transmission signal and the compensation signal; and said generation unit delays the differential signal based on the distortion quantity measured by said measuring unit to generate the compensation signal.

2. The equalization filter according to claim 1, wherein:

said measuring unit measures the distortion quantity, and then determines whether or not the distortion quantity falls within a particular range; and said generation unit delays the differential signal by a predetermined delay amount when said measuring unit determines that the distortion quantity falls within the particular range.

3. The equalization filter according to claim 2, wherein:

said measuring unit adjusts the delay amount of the generation unit in accordance with the distortion quantity when the distortion quantity is determined to fall within the particular range.

4. The equalization filter according to claim 3, wherein:

said generation unit includes:

an adjustment unit for changing the cycle of a clock signal; and a sample-and-hold type delay unit for fetching the differential signal generated by said compensation unit in synchronism with the clock signal, the cycle of which has been changed by said adjustment unit, when said measuring unit determines that the distortion quantity falls within the particular range, and for generating the fetched differential signal as the compensation signal, and said measuring unit adjusts the cycle of the clock signal, changed by said adjustment unit, in accordance with the measured distortion quantity.

5. The equalization filter according to claim 3, wherein:

said generation unit includes a plurality of predetermined delay elements which have delay amounts that are different from one another, and one of which delays the differential signal to generate the compensation signal when said measuring unit determines that the distortion quantity falls within the particular range, and said measuring unit selects a predetermined delay element for generating the compensation signal in accordance with the measured distortion quantity.

6. The equalization filter according to claim 1, wherein:

said distortion quantity is represented by a differential group delay or a branch ratio of optical power.

7. The equalization filter according to claim 2, wherein:

said distortion quantity is represented by a differential group delay or a branch ratio of optical power, and said particular range is such that said differential group delay is in a range included between N−0.15M [UI] and N+0.15M [UI], and said branch ratio is in a range included between 0.4 and 0.6, and said delay amount of the differential signal is set to a value included between N−0.25 [UI] and N+0.25 [UI], where N is an integer equal to or larger than one, and M is one when N is one and two when N is two or more.

8. The equalization filter according to claim 1, comprising:

a rear-stage filter unit for compensating for distortion of the differential signal generated by said compensation unit.

9. The equalization filter according to claim 8, wherein:

said rear-stage filter includes at least one feed forward type equalization filter, or at least one feedback type equalization filter.

10. The equalization filter according to claim 1, comprising:
- a front-stage filter unit for compensating for distortion of the transmission signal received by said input unit,
- wherein said generation unit generates a differential signal which indicates the difference between the transmission signal which has been compensated for distortion by said front-stage filter unit and the compensation signal.

11. The equalization filter according to claim 10, wherein:
said front-stage filter unit includes at least one feed forward type equalization filter, or at least one feedback type equalization filter.

12. The equalization filter according to claim 1, wherein:
said compensation unit linearly amplifies the transmission signal and the compensation signal, and generates a differential signal which indicates the difference between the linearly amplified transmission signal and compensation signal.

13. The equalization filter according to claim 12, wherein:
said measuring unit adjusts an amplification amount of said compensation unit in accordance with the measured distortion quantity.

14. The equalization filter according to claim 8, wherein:
a parameter of said rear-stage filter unit for compensating for distortion of the transmission signal has a fixed value,
said compensation unit linearly amplifies the transmission signal and the compensation signal, and generates a differential signal which indicates the difference between the linearly amplified transmission signal and compensation signal, and
said measuring unit adjusts an amplification amount of said compensation unit in accordance with the measured distortion quantity.

15. The equalization filter according to claim 10, wherein:
a parameter of said front-stage filter unit for compensating for distortion of the transmission signal has a fixed value,
said compensation unit linearly amplifies the transmission signal and the compensation signal, and generates a differential signal which indicates the difference between the linearly amplified transmission signal and compensation signal, and
said measuring unit adjusts an amplification amount of said compensation unit in accordance with the measured distortion quantity.

16. The equalization filter according to claim 1, wherein:
said generation unit assumes the transmission signal and the compensation signal as ternary signals, takes a ternary exclusive logical OR for the transmission signal and the compensation signal, and generates the result of the operation as a differential signal.

17. A distortion compensating method performed by an equalization filter comprising an input unit for receiving a transmission signal, a generation unit for generating a compensation signal for compensating for distortion of the transmission signal, and a compensation unit for compensating for distortion of the transmission signal based on the compensation signal, said method comprising:
- measuring a distortion quantity which characterizes the distortion of the transmission signal;
- generating a differential signal which indicates the difference between the transmission signal and the compensation signal; and
- delaying the differential signal based on the measured distortion quantity measured to generate the compensation signal.

18. The distortion compensating method according to claim 17, comprising:
determining whether or not the distortion quantity falls within a particular range after the distortion quantity is measured,
wherein said delaying includes delaying the differential signal by a predetermined delay amount when the distortion quantity is determined to fall within the particular range.

19. The distortion compensating method according to claim 18, comprising:
adjusting a delay amount of the differential signal in accordance with the distortion quantity when the distortion quantity is determined to fall within the particular range.

20. The distortion compensating method according to claim 19, comprising:
- changing the cycle of a clock signal;
- adjusting the cycle of the clock signal, changed at said cycle changing step, in accordance with the measured distortion quantity;
- fetching the generated differential signal in synchronization with the clock signal, the cycle of which has been changed, when the distortion quantity is determined to fall within the particular range; and
- generating the fetched differential signal as the compensation signal.

21. The distortion compensating method according to claim 19, wherein:
said generation unit includes a plurality of predetermined delay elements having delay amounts that are different from one another, and
said method comprises selecting a predetermined delay element for delaying the differential signal to generate the compensation signal when the distortion quantity is determined to fall within the particular range.

22. The distortion compensation method according to claim 17, wherein:
said distortion quantity is represented by a differential group delay and a branch ratio of optical power.

23. The distortion compensation method according to claim 18, wherein:
said distortion quantity is represented by a differential group delay and a branch ratio of optical power, and
said particular range is such that said differential group delay is in a range included between N−0.15M [UI] and N+0.15M [UI], and said branch ratio is in a range included between 0.4 and 0.6, and said delay amount of the differential signal is set to a value included between N−0.25 [UI] and N+0.25 [UI], where N is an integer equal to or larger than one, and M is one when N is one and two when N is two or more.

24. The distortion compensation method according to claim 17, comprising:
compensating for distortion of the generated differential signal.

25. The distortion compensating method according to claim 17, comprising:
compensating for distortion of the received transmission signal,
wherein said differential includes generating a differential signal which indicates the difference between the transmission signal whose distortion has been compensated for and the compensation signal.

26. The distortion compensating method according to claim 17, comprising:
linearly amplifying the transmission signal and the compensation signal; and generating a differential signal which indicates the difference between the linearly amplified transmission signal and compensation signal.

27. The distortion compensating method according to claim 26, comprising adjusting amplification amounts of the transmission signal and the compensation signal in accordance with the measured distortion quantity.

28. The distortion compensating method according to claim 24, wherein:
- a parameter for compensating for distortion of the transmission signal has a fixed value, and
- said method comprises:
- linearly amplifying the transmission signal and the compensation signal; and
- generating a differential signal which indicates the difference between the linearly amplified transmission signal and compensation signal.

29. The distortion compensating method according to claim 25, wherein:
- a parameter for compensating for distortion of the transmission signal has a fixed value, and
- said method comprises:
- linearly amplifying the transmission signal and the compensation signal; and
- generating a differential signal which indicates the difference between the linearly amplified transmission signal and compensation signal.

30. The distortion compensating method according to claim 17, wherein:
- said generating assumes the transmission signal and the compensation signal as ternary signals, takes a ternary exclusive logical OR for the transmission signal and the compensation signal, and generates the result of the operation as a differential signal.

* * * * *